(12) United States Patent
Gupta

(10) Patent No.: US 11,262,018 B2
(45) Date of Patent: Mar. 1, 2022

(54) STORAGE RACK

(71) Applicant: Anil Gupta, Pittsburgh, PA (US)

(72) Inventor: Anil Gupta, Pittsburgh, PA (US)

( * ) Notice: Subject to any disclaimer, the term of this patent is extended or adjusted under 35 U.S.C. 154(b) by 426 days.

(21) Appl. No.: 15/962,000

(22) Filed: Apr. 25, 2018

(65) Prior Publication Data

US 2019/0331288 A1     Oct. 31, 2019

(51) Int. Cl.
| | |
|---|---|
| *F16M 11/04* | (2006.01) |
| *A47B 96/02* | (2006.01) |
| *A47B 45/00* | (2006.01) |
| *A47F 5/08* | (2006.01) |
| *F16M 11/18* | (2006.01) |
| *F16M 13/02* | (2006.01) |
| *A47B 96/14* | (2006.01) |
| *A47B 57/08* | (2006.01) |
| *B65G 1/02* | (2006.01) |

(52) U.S. Cl.
CPC ........... *F16M 11/043* (2013.01); *A47B 45/00* (2013.01); *A47B 96/027* (2013.01); *A47F 5/0846* (2013.01); *F16M 11/18* (2013.01); *A47B 57/08* (2013.01); *A47B 96/14* (2013.01); *B65G 1/02* (2013.01); *F16M 13/022* (2013.01)

(58) Field of Classification Search
CPC ....... A47B 57/08; A47B 45/00; A47B 57/585; A47B 96/021; A47B 96/025; A47B 57/42; A47B 65/00; A47B 65/10; A47B 96/027; A47B 57/16; A47B 57/425; A47B 57/46; A47B 47/0091; B65G 1/02; A47F 5/0838; A47F 5/0846; A47F 5/0093; A47F 5/00; A47F 1/126; A47F 5/005; A47F 1/125; A47F 1/12; A47F 5/103; A47F 3/14; A47F 5/0025; A47F 5/0823; A47F 5/101; B65D 25/102; B60P 7/0823; G02B 6/4452; G02B 6/3897
See application file for complete search history.

(56) References Cited

U.S. PATENT DOCUMENTS

| | | | | |
|---|---|---|---|---|
| 2,720,316 | A * | 10/1955 | Glascott | A47B 61/003 108/28 |
| 3,033,375 | A * | 5/1962 | Cole | A47F 7/28 211/75 |
| 3,121,494 | A * | 2/1964 | Berk | A47B 57/586 211/43 |
| 3,556,306 | A * | 1/1971 | Shell | A47B 96/021 211/90.02 |

(Continued)

FOREIGN PATENT DOCUMENTS

| | | | | |
|---|---|---|---|---|
| CA | 2264410 A1 * | 9/1999 | ............ | B65D 25/102 |
| DE | 3111257 A1 * | 9/1982 | ............. | A47B 65/10 |

(Continued)

*Primary Examiner* — Jonathan Liu
*Assistant Examiner* — Taylor L Morris
(74) *Attorney, Agent, or Firm* — AP Patents; Alexander Pokot

(57) ABSTRACT

An apparatus that at least stores objects of varying sizes, said apparatus includes adjustable trays configured to support the objects at bottom surfaces thereof and stationary or mobile panels for mounting the trays in a generally vertical plane. The panels can be provided as pegboard types or as slatwall types. The adjustable trays include a pair of brackets connected with a guide. A mounting portion of each bracket is adapted to mate with the corresponding panel type.

25 Claims, 12 Drawing Sheets

(56) References Cited

U.S. PATENT DOCUMENTS

| | | | | |
|---|---|---|---|---|
| 3,563,182 | A * | 2/1971 | MacFarlane | A47B 61/003 108/29 |
| 3,765,344 | A * | 10/1973 | Ferdinand | A47F 5/103 108/108 |
| 4,094,416 | A * | 6/1978 | Smith | A47B 45/00 211/85.28 |
| 4,181,279 | A * | 1/1980 | Perrault | F16L 3/00 248/70 |
| 4,356,923 | A * | 11/1982 | Young | A47F 7/28 211/184 |
| 4,484,847 | A * | 11/1984 | Holmes | B61D 45/00 24/265 R |
| 4,576,292 | A * | 3/1986 | Percival | A47F 5/0018 211/49.1 |
| 4,685,574 | A * | 8/1987 | Young | A47F 1/12 211/184 |
| 4,736,919 | A * | 4/1988 | Bessinger | A47K 1/08 108/152 |
| 4,762,235 | A * | 8/1988 | Howard | A47B 57/46 108/109 |
| 4,768,661 | A * | 9/1988 | Pfeifer | A47F 5/005 211/184 |
| 4,801,025 | A * | 1/1989 | Flum | A47F 5/00 211/126.1 |
| 4,817,900 | A * | 4/1989 | Whittington | A47B 57/585 211/162 |
| 4,844,266 | A * | 7/1989 | Small | A47F 5/005 211/88.01 |
| 4,936,409 | A * | 6/1990 | Nix | B60R 16/04 180/68.5 |
| 4,984,759 | A * | 1/1991 | Perlant | B65B 67/1227 108/108 |
| 4,995,323 | A * | 2/1991 | Kellems | A47B 96/00 108/157.13 |
| D317,220 | S * | 5/1991 | Diamond | D3/305 |
| 5,031,781 | A * | 7/1991 | Price | A47F 7/163 211/128.1 |
| 5,096,272 | A * | 3/1992 | Belokin, Jr. | A47F 3/06 211/90.01 |
| 5,139,186 | A * | 8/1992 | Loew | B60R 11/00 206/3 |
| 5,228,579 | A * | 7/1993 | Kaufman | A47F 5/0846 211/94.01 |
| 5,273,154 | A * | 12/1993 | Braun | A45C 11/16 206/495 |
| 5,284,257 | A * | 2/1994 | Schum | A47F 5/0846 211/128.1 |
| 5,293,998 | A * | 3/1994 | George | B65D 83/00 206/388 |
| 5,295,596 | A * | 3/1994 | Squitieri | A47F 5/0068 211/175 |
| 5,346,078 | A * | 9/1994 | Ernetoft | A47F 5/0846 211/40 |
| 5,390,802 | A * | 2/1995 | Pappagallo | A47B 45/00 211/187 |
| 5,458,019 | A * | 10/1995 | Trevino | G02B 6/4452 385/134 |
| 5,458,248 | A * | 10/1995 | Alain | A47B 45/00 211/153 |
| 5,485,933 | A * | 1/1996 | Crooymans | A47B 96/063 211/153 |
| 5,518,348 | A * | 5/1996 | Tucker | B60P 7/0869 410/41 |
| 5,607,070 | A * | 3/1997 | Hellyer | A47F 5/108 211/189 |
| 5,653,349 | A * | 8/1997 | Dana | F16B 12/34 211/189 |
| 5,746,328 | A * | 5/1998 | Beeler | A47F 1/126 211/59.3 |
| 5,855,283 | A * | 1/1999 | Johnson | A47F 1/126 211/103 |
| 5,857,577 | A * | 1/1999 | Thomas | A47B 57/26 211/94.01 |
| 5,921,411 | A * | 7/1999 | Merl | A47F 5/103 211/90.01 |
| 5,944,203 | A * | 8/1999 | Vlah | A47F 5/0846 211/189 |
| 6,041,720 | A * | 3/2000 | Hardy | A47B 96/02 108/60 |
| 6,065,611 | A * | 5/2000 | Huang | G06F 1/181 211/26 |
| 6,068,135 | A * | 5/2000 | Holztrager | A47F 5/0846 211/4 |
| 6,068,139 | A * | 5/2000 | Brozak, Jr. | A47F 1/12 211/169 |
| 6,142,317 | A * | 11/2000 | Merl | A47F 1/125 211/184 |
| 6,164,462 | A * | 12/2000 | Mumford | A47F 5/0093 108/102 |
| 6,164,467 | A * | 12/2000 | DePottey | A47F 5/0846 211/189 |
| 6,224,128 | B1 * | 5/2001 | Mains | A47B 45/00 108/44 |
| 6,276,538 | B1 * | 8/2001 | Battaglia | A47F 1/12 108/108 |
| 6,364,136 | B1 * | 4/2002 | Weshler | A47B 96/025 108/102 |
| 6,598,270 | B2 * | 7/2003 | Larsen | H05K 5/0204 24/16 R |
| 7,124,898 | B2 * | 10/2006 | Richter | A47F 1/12 211/59.3 |
| 7,150,364 | B2 * | 12/2006 | Jablow | A47B 45/00 211/153 |
| 7,438,268 | B2 * | 10/2008 | Kologe | A47F 5/0838 248/220.22 |
| 7,458,473 | B1 * | 12/2008 | Mason | A47F 1/126 211/175 |
| 7,478,731 | B1 * | 1/2009 | Mason | A47F 1/126 211/59.3 |
| 7,654,497 | B1 * | 2/2010 | Karan | A47B 45/00 248/243 |
| 7,681,744 | B2 * | 3/2010 | Johnson | A47F 1/126 211/59.3 |
| 7,743,931 | B2 * | 6/2010 | Barkdoll | A47F 5/0861 211/7 |
| 8,066,128 | B2 * | 11/2011 | Crawbuck | A47F 1/125 211/59.3 |
| 8,093,499 | B2 * | 1/2012 | Hoffer | H05K 7/186 174/72 A |
| 8,113,360 | B2 * | 2/2012 | Olson | A47F 5/005 211/59.3 |
| 8,132,680 | B2 * | 3/2012 | Takashima | A47F 5/0025 211/59.3 |
| 8,453,850 | B2 * | 6/2013 | Hardy | A47F 1/126 211/59.3 |
| 8,752,718 | B2 * | 6/2014 | Stukenberg | A47G 25/0664 211/87.01 |
| 8,777,019 | B2 * | 7/2014 | Dovell | A47B 73/00 211/74 |
| 8,777,022 | B2 * | 7/2014 | Artigues | A47B 45/00 211/90.02 |
| 8,789,712 | B2 * | 7/2014 | Johnson | A47F 5/0025 211/71.01 |
| 8,807,356 | B2 * | 8/2014 | Weigand | A47F 5/10 211/183 |
| 8,936,163 | B2 * | 1/2015 | Fleischer | H05K 5/0204 211/26.2 |
| 9,138,075 | B2 * | 9/2015 | Hardy | A47F 7/28 |
| 9,215,938 | B2 * | 12/2015 | Neumann | A47F 1/128 |
| 9,289,064 | B2 * | 3/2016 | LaMontagne | A47B 96/021 |
| 9,428,907 | B2 * | 8/2016 | Gupta | E04B 2/7438 |
| 9,429,251 | B1 * | 8/2016 | Lin | H04Q 1/06 |
| 9,468,312 | B2 * | 10/2016 | Denby | A47F 5/108 |
| 9,596,948 | B1 * | 3/2017 | McGinnis | A47F 5/00 |
| 9,743,762 | B1 * | 8/2017 | Beuses | A47B 95/00 |
| 9,918,567 | B2 * | 3/2018 | Pena | A47F 5/0087 |
| 9,955,802 | B2 * | 5/2018 | Bird | A47B 57/58 |

(56) References Cited

U.S. PATENT DOCUMENTS

| | | | |
|---|---|---|---|
| 9,974,205 B1* | 5/2018 | Clark | H05K 7/1491 |
| 10,178,909 B2* | 1/2019 | Hardy | A47F 7/28 |
| 10,308,395 B2* | 6/2019 | Zhang | B65D 21/086 |
| 2003/0217980 A1* | 11/2003 | Johnson | A47F 1/126 |
| | | | 211/59.3 |
| 2004/0245200 A1* | 12/2004 | Jersey | A47B 81/007 |
| | | | 211/189 |
| 2005/0224437 A1* | 10/2005 | Lee | A47F 5/005 |
| | | | 211/184 |
| 2005/0230338 A1* | 10/2005 | Farinola | A47F 5/0838 |
| | | | 211/186 |
| 2005/0236341 A1* | 10/2005 | Bao | A47F 7/0021 |
| | | | 211/13.1 |
| 2005/0274681 A1* | 12/2005 | Rivers | A47B 65/20 |
| | | | 211/43 |
| 2006/0236896 A1* | 10/2006 | Heroux | A47H 27/00 |
| | | | 108/11 |
| 2007/0175839 A1* | 8/2007 | Schneider | A47F 3/14 |
| | | | 211/59.3 |
| 2007/0267365 A1* | 11/2007 | Saito | A47F 1/126 |
| | | | 211/59.3 |
| 2008/0078728 A1* | 4/2008 | Hodge | A47F 5/0846 |
| | | | 211/55 |
| 2008/0169737 A1* | 7/2008 | Shen | A47B 45/00 |
| | | | 312/205 |
| 2008/0230501 A1* | 9/2008 | Gray | A47B 46/005 |
| | | | 211/149 |
| 2009/0101606 A1* | 4/2009 | Olson | A47F 5/005 |
| | | | 211/59.3 |
| 2009/0273915 A1* | 11/2009 | Dean, Jr. | G02B 6/4459 |
| | | | 361/826 |
| 2010/0072150 A1* | 3/2010 | Takashima | A47F 5/0025 |
| | | | 211/59.3 |
| 2010/0107670 A1* | 5/2010 | Kottke | A47F 3/14 |
| | | | 62/250 |
| 2010/0181273 A1* | 7/2010 | Nagel | A47F 3/14 |
| | | | 211/162 |
| 2011/0132853 A1* | 6/2011 | Drobot | A47B 57/562 |
| | | | 211/42 |
| 2011/0147323 A1* | 6/2011 | Sainato | A47F 5/005 |
| | | | 211/59.2 |
| 2012/0074087 A1* | 3/2012 | Neumann | A47B 45/00 |
| | | | 211/134 |
| 2012/0255924 A1* | 10/2012 | Kologe | A47F 5/0025 |
| | | | 211/126.15 |
| 2013/0180937 A1* | 7/2013 | Tabrizi | E04G 21/167 |
| | | | 211/49.1 |
| 2013/0233814 A1* | 9/2013 | Gupta | A47B 81/00 |
| | | | 211/74 |
| 2014/0014607 A1* | 1/2014 | Mikich | A47B 96/027 |
| | | | 211/195 |
| 2014/0034591 A1* | 2/2014 | Szpak | A47B 96/068 |
| | | | 211/59.2 |
| 2014/0305889 A1* | 10/2014 | Vogler | A47F 1/12 |
| | | | 211/59.3 |
| 2014/0305891 A1* | 10/2014 | Vogler | A47F 5/0846 |
| | | | 211/59.3 |
| 2015/0068999 A1* | 3/2015 | Dart | A47B 96/025 |
| | | | 211/186 |
| 2017/0114952 A1* | 4/2017 | Green | A47G 7/044 |
| 2017/0184224 A1* | 6/2017 | Cheng | H05K 7/1492 |
| 2018/0070746 A1* | 3/2018 | Wang | A47F 5/103 |
| 2018/0153312 A1* | 6/2018 | Buck | A47F 5/0025 |
| 2018/0360236 A1* | 12/2018 | Kim | A47F 5/16 |

FOREIGN PATENT DOCUMENTS

| | | | |
|---|---|---|---|
| GB | 1375123 A | * 11/1974 | B62B 3/02 |
| WO | WO-2009069865 A1 | * 6/2009 | A47F 5/0846 |

\* cited by examiner

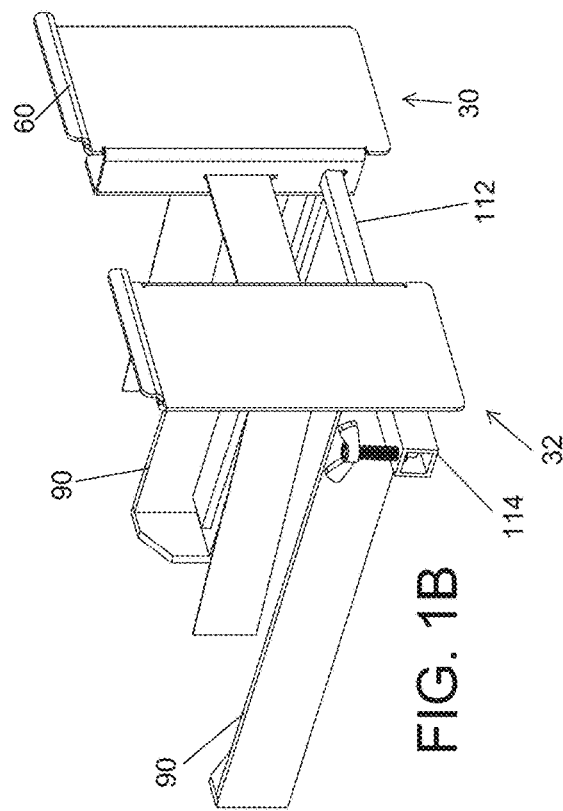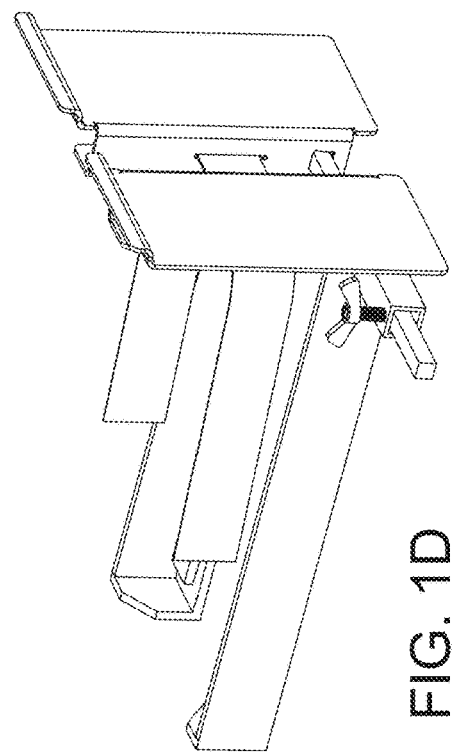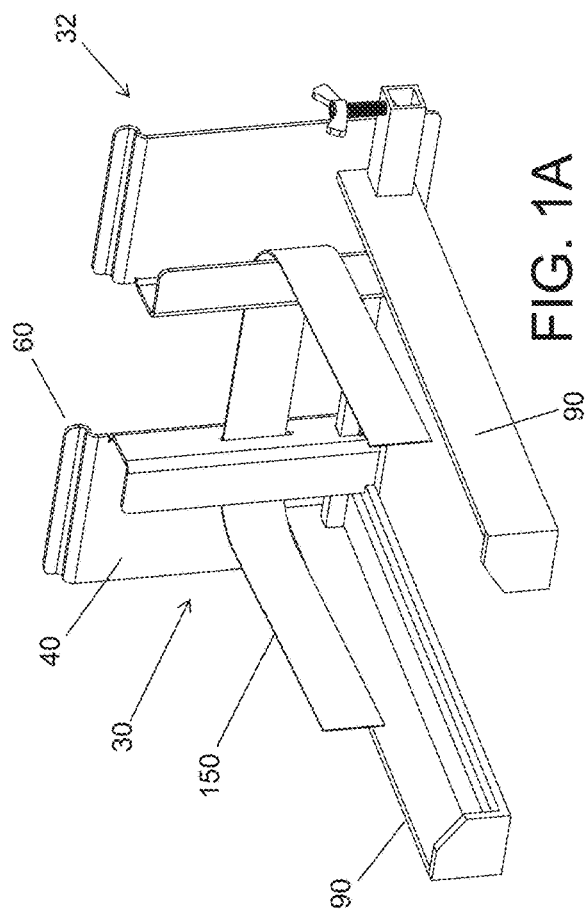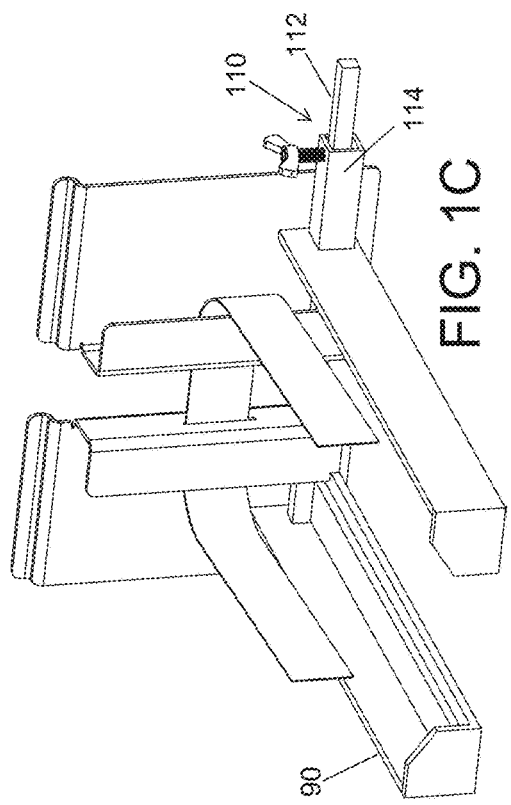

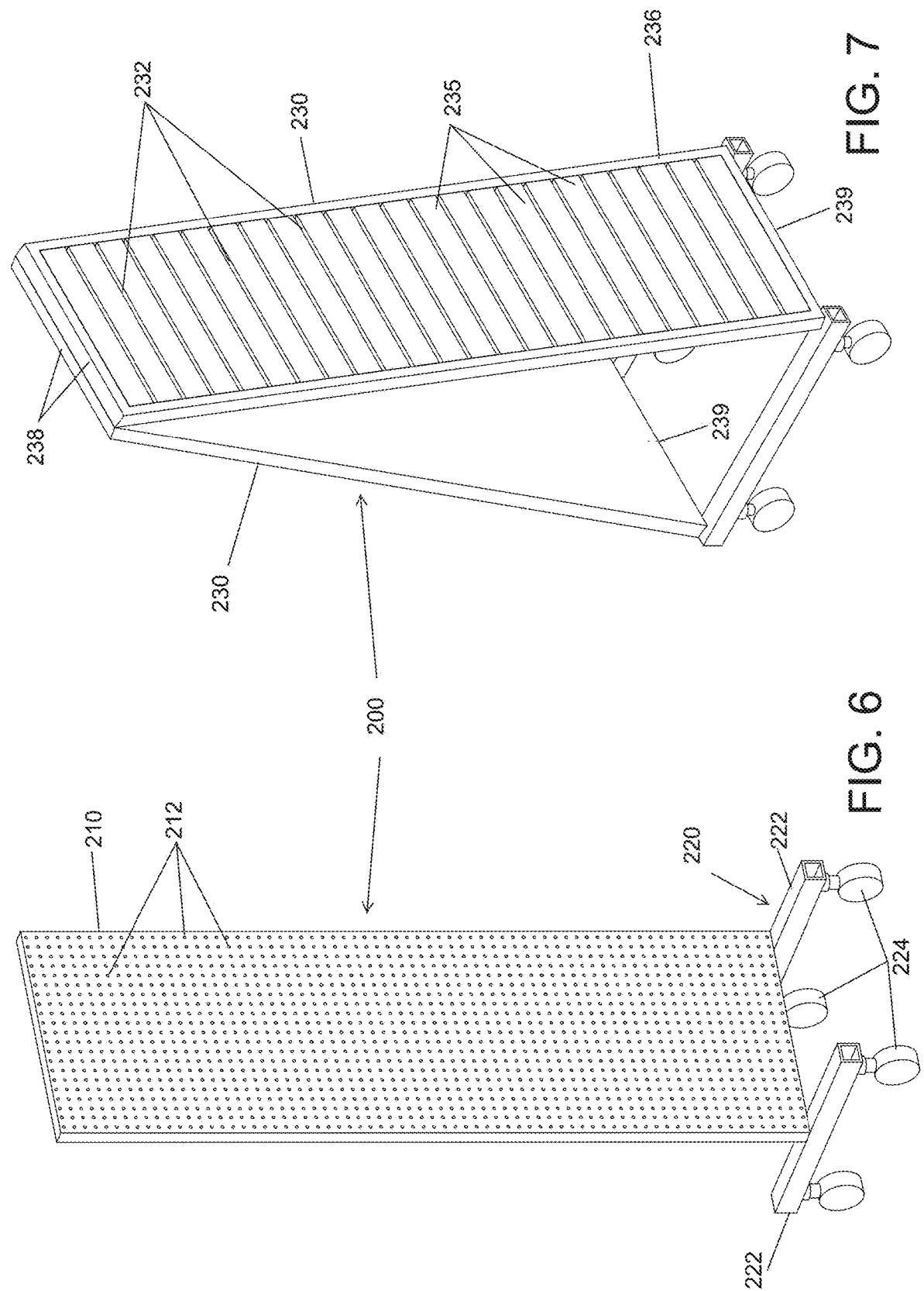

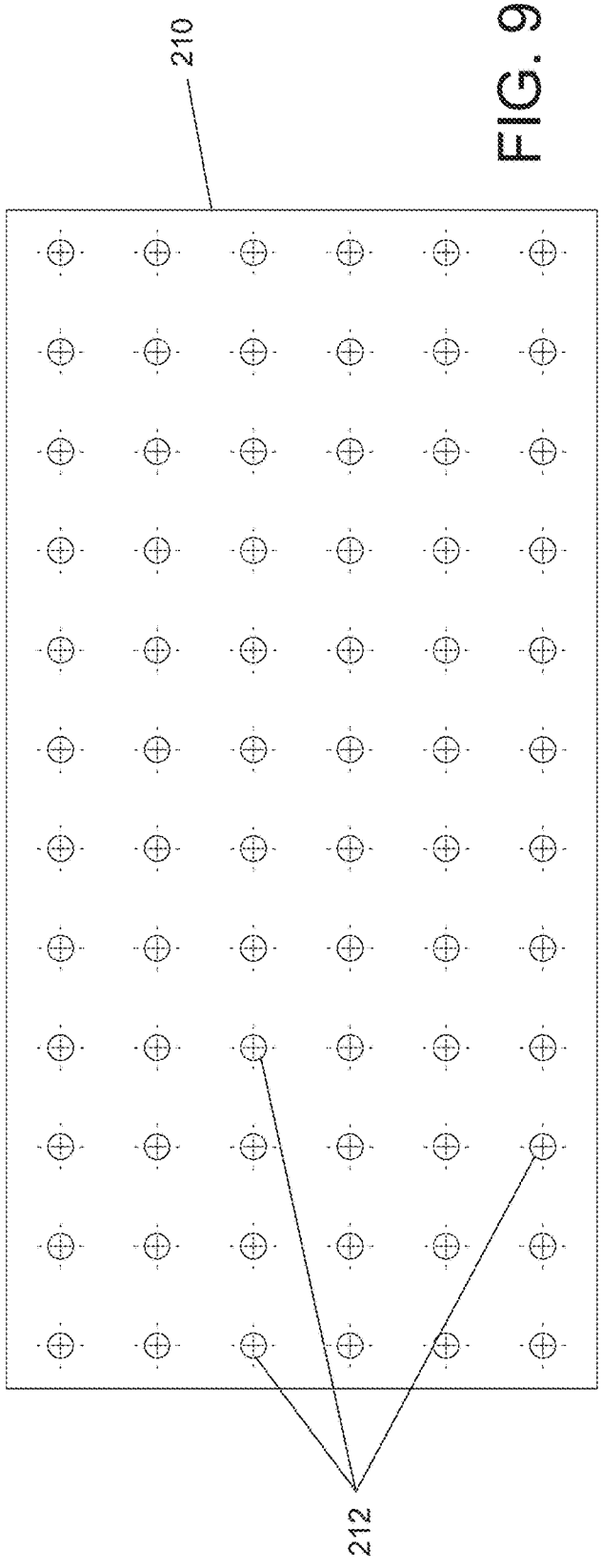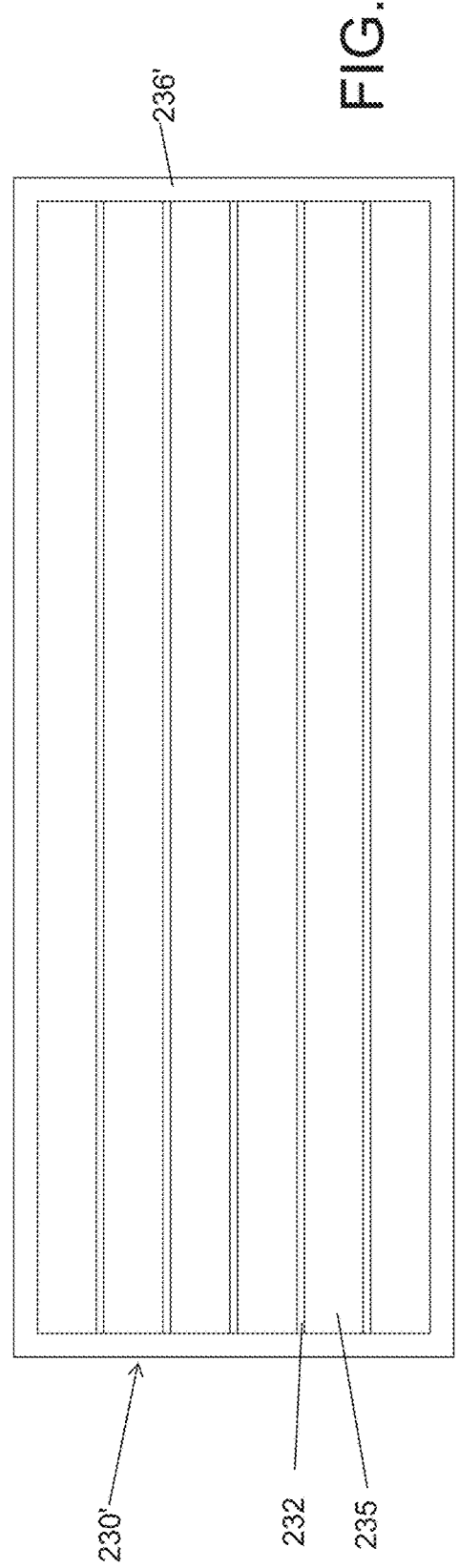

STORAGE RACK

CROSS-REFERENCE TO RELATED APPLICATIONS

N/A

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates to storage racks. It further relates to storage racks for plug-in units used in track busways for power distribution.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present subject matter, or any embodiments thereof, to anything stated or implied therein or inferred thereupon.

As is generally known, boxes, bins or containers of different sizes are utilized for storage of goods in residential, commercial or industrial applications. Often, the boxes, bins or containers are either stacked one or top of another or placed onto shelves. When the boxes, bins and containers are placed onto a shelf, the shelf is disposed generally stationary, being either provided as a part of a rack or a stand-alone unit fixed to a wall. When the shelf is a part of the rack, there can be often an empty space, as the vertical distance between the shelves can be set to accommodate boxes, bins or containers of maximum size, thus creating spaces or voids when the boxes, bins or containers are sized smaller than a vertical distance between the shelves.

It is also generally known that display racks are utilized for advertising or promoting different goods. Like with storage racks, display rack may be limited to displaying goods of approximately the same size, creating wasted space when displaying goods of different sizes. Thus, there is at least a need to provide an adjustable storage or display arrangement that maximizes utilization of available space.

In some applications, goods, shipped in bulk arrangements, can be stored after being removed from boxes, packages, crates, skids or pallets. One such application is in a power distribution utilizing track busways. In some cases, track busways can be attached to a vertical wall. In some cases, track busways can be mounted within a cabinet. In some cases, track busways can be attached to the back panel of a workbench.

In some cases, track busways can be mounted overhead, for example such as in data centers. Some cases require power monitoring and/or protection from surges. In these cases, plug-in units can be typically used. Some plug-in units include a connector extending outwardly from one surface of a housing for mechanical and electrical coupling with a track portion, generally by a 90-degree turn. Generally, plug-in units are configured to measure any one of voltage, current, power, energy, and power factor. Some plug-in units include a circuit breaker. In other words, plug-in units can be configured to perform different functions. Plug-in units for overhead power distribution generally include a power cable that extends outwardly from a surface of the housing that is opposite to the surface having the connector extending therefrom. Due to different applications and plurality of manufacturers, plug-in units come in a variety of different sizes. Furthermore, plug-in units of different sizes or of different functions can be used with the same track busway in a single application.

At least in mission-critical applications, for example such as data centers, it necessary to store some quantity of unpacked plug-in units within the data center for activating additional data storage or processing units. Furthermore, it may be desirable to minimize time needed to retrieve and transport a plurality of plug-in units from a storage location to a point of use so as to reduce downtime due to installation of plug-in unit(s).

Furthermore, during installation of track busways, particularly of overhead type, more than one functional type of plug-in units may be required.

Generally, storage solutions for unpacked plug-in units provide stationary racks that are positioned against one wall of the data center and that are adapted with fixed arms or fixed width trays. With these storage solutions, a person tasked with installing a plurality of plug-in units is required to either carry plug-in units or place them onto a rolling cart or other suitable device. If this person unintentionally retrieves an incorrect plug-in unit, the person must return to the storage location and retrieve a correct plug-in unit, now resulting in additional equipment downtime. Furthermore, with these storage solutions, either different racks are required to store plug-in unit of different sizes or of different functions.

Therefore, there is at least a further need for an improved storage solution for goods of varying sizes. There is also a need for an improved storage solution for plug-in units for track busways in power distribution that provides for a storage of plug-in units of different sizes within the storage device. There is a further need for ease of transporting plug-in units of different sizes to a point of use.

BRIEF DESCRIPTION OF THE DRAWINGS

The accompanying drawings are incorporated in and constitute part of the specification and illustrate various embodiments. In the drawings:

FIGS. 1A-1D illustrate 3D views of a tray in an accordance with an exemplary embodiment;

FIG. 6 illustrates a 3D view of a tray mounting member in an accordance with an exemplary embodiment;

FIG. 7 illustrates a 3D view of a tray mounting member in an accordance with an exemplary embodiment;

FIG. 9 illustrates a 3D view of a tray mounting member in an accordance with an exemplary embodiment;

FIG. 10 illustrates a 3D view of a tray mounting member in an accordance with an exemplary embodiment;

DETAILED DESCRIPTION OF EXEMPLARY EMBODIMENTS

Figure 2A:
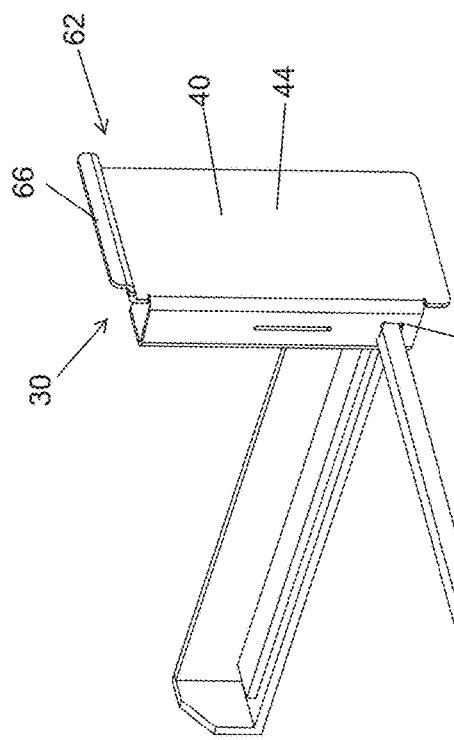
FIGS. 2A-2D illustrate 3D views of one bracket of the tray of FIGS. 1A-1D.
Figure 2B:
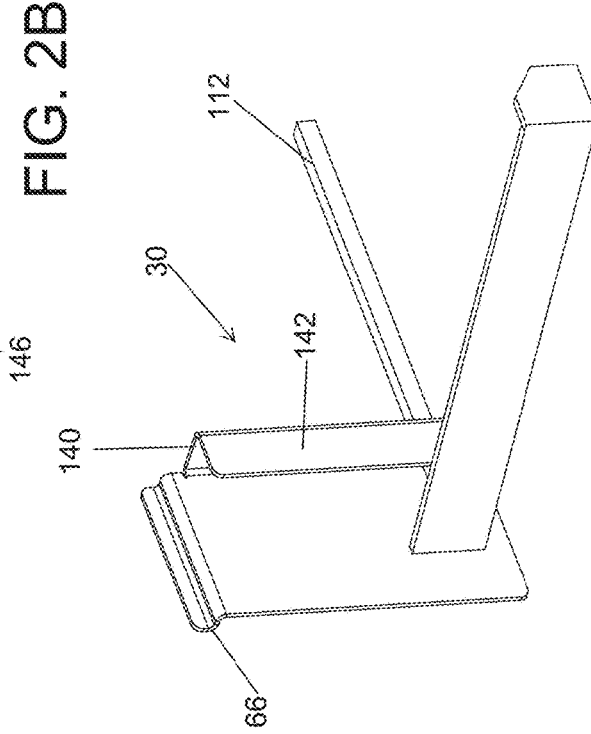
Figure 2C:
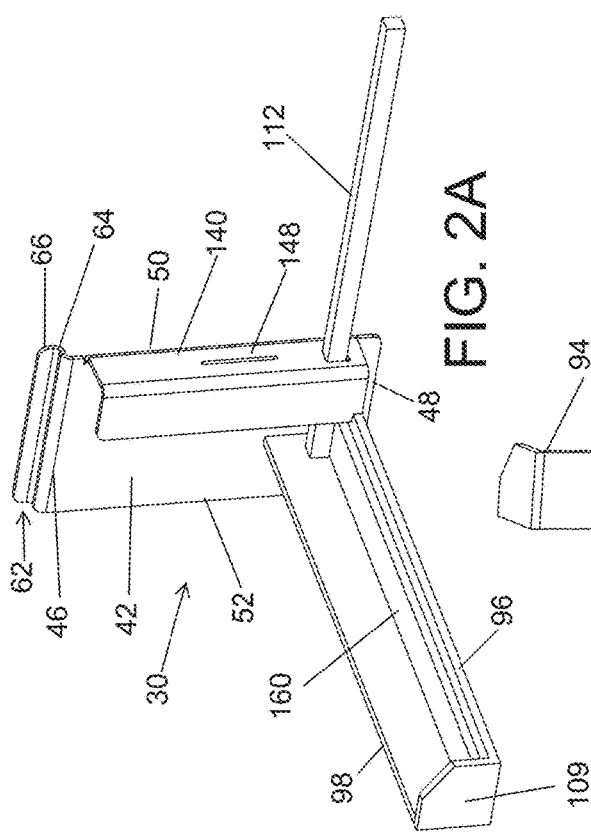
Figure 2D:
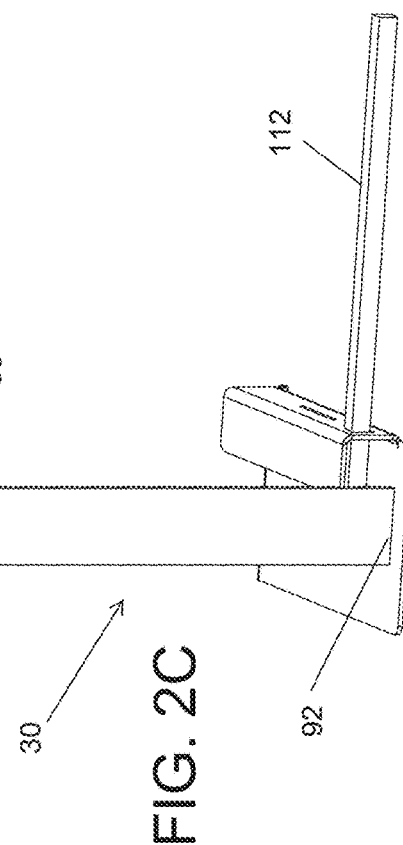

Prior to proceeding to the more detailed description of the present subject matter, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As used herein, the word "example" means "serving as an example, instance, or illustration." Any implementation described herein as "embodiment" or "example", is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

The terms and words used in the following description and claims are not limited to the bibliographical meanings, but, are merely used to enable a clear and consistent understanding of the exemplary embodiments. Accordingly, it should be apparent to those skilled in the art that the following description of exemplary embodiments are provided for illustration purpose only and not for the purpose of limiting the invention as defined by the appended claims and their equivalents.

Furthermore, there is no intention to be bound by any expressed or implied theory presented in the preceding technical field, background, or the following detailed description. It is also to be understood that the specific devices and processes illustrated in the attached drawings, and described in the following specification, are simply examples of the inventive concepts defined in the appended claims.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

For purposes of description herein, the directional and/or relationary terms such as "upper," "top," "lower," "bottom," "left," "right," "rear," "back," "front," "apex," "vertical," "horizontal," "lateral," "exterior," "interior," and derivatives thereof are relative to each other and are dependent on the specific orientation of an applicable element or article, and are used accordingly to aid in the description of the various embodiments and are not necessarily intended to be construed as limiting. For example, if the component or device in the figures is turned over, element described as "top" would then be oriented as "bottom". Thus, the exemplary term "top" can encompass both an orientation of top and bottom.

The term "couple" or "coupled" when used in this specification and appended claims refers to an indirect or direct physical connection between the identified elements, components, or objects. Often the manner of the coupling will be related specifically to the manner in which the two coupled elements interact.

The term "directly coupled" or "coupled directly," when used in this specification and appended claims, refers to a physical connection between identified elements, components, or objects, in which no other element, component, or object resides between those identified as being directly coupled.

The terms "removable", "removably coupled", "removably disposed," "readily removable", "readily detachable", "detachably coupled", "separable," "separably coupled," "releaseably attached", "detachably attached" and similar terms, when used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

The term "substantially vertically" as used herein when referring to elements or features of the mounting members should be understood to mean that such elements or features are positioned with respect to a vertical line extending there above at an angle of 90°, except for manufacturing tolerances. The angle can be in the range of from about 890 to about 910, in the range of from about 880 to about 920, in the range of from about 870 to about 930, or in the range of from about 850 to about 950. In other words, the term "substantially vertically" should be also understood to mean that, if deviating from absolutely vertical, the mounting members or tray functions to position any objects 2 in a vertical plane.

The term "generally horizontal(ly)" or "generally vertical (ly)" should be also understood to mean respectively horizontally or vertically disposed element or surface but the term does not exclude the possibility of orienting such feature or surface at a small angle relative to respectively absolute horizontal or vertical plane or line.

It is to be understood that the singular forms "a," "an," and "the" include plural references unless the context clearly dictates otherwise. Thus, for example, reference to "a surface" can include reference to one or more of such surfaces.

The particular embodiments of the present disclosure generally provide apparatus and methods directed to storage of objects of varying sizes.

In particular embodiments, a mounting member is provided as a mobile member.

In particular embodiments, a mounting member is provided as a stationary member.

Now in a reference to FIGS. 1A-3D, therein is illustrated a tray 20 configured to adjustably support objects 2. The tray 20 comprises a first bracket 30 and a second bracket 32 mounted, during use of the tray 20, in a side-by-side relationship with each other in a generally horizontal direction. Each bracket 30, 32 comprises a main portion 40, a mounting member 60 disposed at one edge of the main portion 40, and a support arm 90 having a proximal end 92 thereof being rigidly secured to the main portion 40. The support arm 90 extends outwardly from the main portion 40. There is also a guide 110 having a first portion 112 thereof securely coupled to one bracket, for example such as the bracket 30 and a second portion 114 thereof securely coupled to the other bracket 32, the first portion 112 and the second portion 114 are being configured to move in a linear direction relative to one another while being interlocked with each other.

The main portion 40 is illustrated as being identical in either bracket 30, 32 and is further illustrated as comprising a pair of planar surfaces 42 and 44 spaced apart from each other to define a thickness of the main portion 40. During use of the tray 20, the main portion 40 also defines a first edge 46 being a top edge, a second edge 48 being a bottom edge, a third edge 50 being one side edge and a fourth edge 52 being an opposite side edge. The main portion 40 is being further illustrated as having a uniform thickness throughout so that the main portion 40 can be easily manufactured from a sheet metal. However, the main portion 40 can have irregular (non-uniform) thickness and even voids in the thickness, for example when such main portion 40 is manufactured as a casting or a molding. In this example, one or more of the edges 46, 48, 50 and 52 do not have to be provided as straight edges.

The mounting member 60 is illustrated as being rigidly secured to the first edge 46 of the main portion 40. The mounting member 60 can be provided in different configurations. In an example of FIGS. 1A-3D, the mounting member 60 comprises a flange 62 extending generally horizontally during use of the tray 20. The flange 62 comprises a first portion 64 disposed generally horizontally during use of the tray 20 and a second portion 66 disposed generally vertically during the use of the tray 20 and extending upwardly from the first portion 64 of the flange 62. The first and second portions, 64 and 66 respectively, of the flange 62 define an L-shaped configuration of the flange 62 in a plane normal to a length thereof. In this configuration, the second portion 66 is disposed upwardly during use of the tray 20. A length of the flange 62 can be about equal to a length of the first edge 46, can be smaller or can be larger. In an example, the flange 62 can be provided integral with the main portion 40 by being formed or stamped from the same sheet metal blank or being defined during a casting or molding operation. In an example, the flange 62 can be also provided as a separate member and attached to the main portion 40 by welding, fastening or like processes. In either example, the flange 62 is coupled with main portion 40 sufficiently to suspend the main portion 40 and the respective brackets 30, 32 with the weight supported thereon.

Figure 4A:
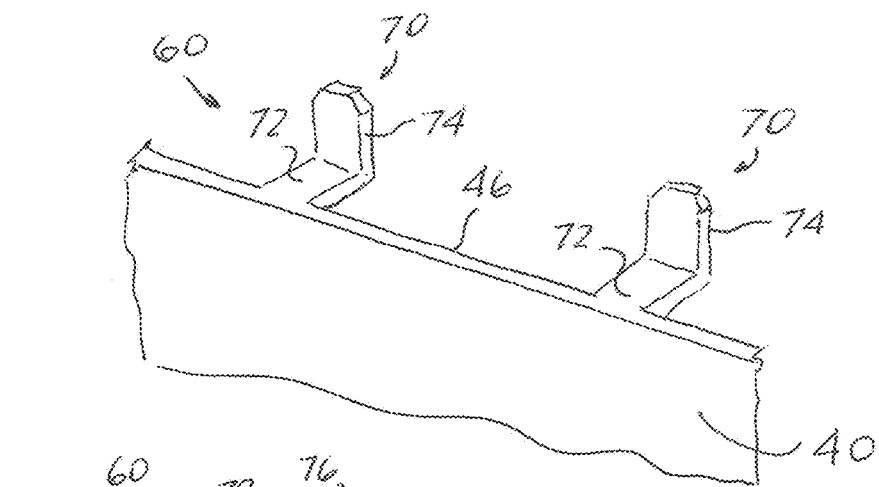
FIGS. 4A-4D illustrate various examples of a mounting flange employed within the tray of FIGS. 1A-3D.

In an example of FIG. 4A, the mounting member 60 can comprise a pair of hooks 70 disposed in a spaced apart relationship with each other along the first edge 46 of the main portion 40. Each hook 70 is illustrated as defining an L-shaped configuration with a first portion 72 disposed generally horizontally during use of the tray 20 and a second portion 74 disposed generally vertically during the use of the tray 20 and extending upwardly from the first portion 72 of each hook 70. The hooks 70 can be provided integral with the main portion 40 by being formed or stamped from the same sheet metal blank or being defined during the casting or molding operation.

Figure 4B:
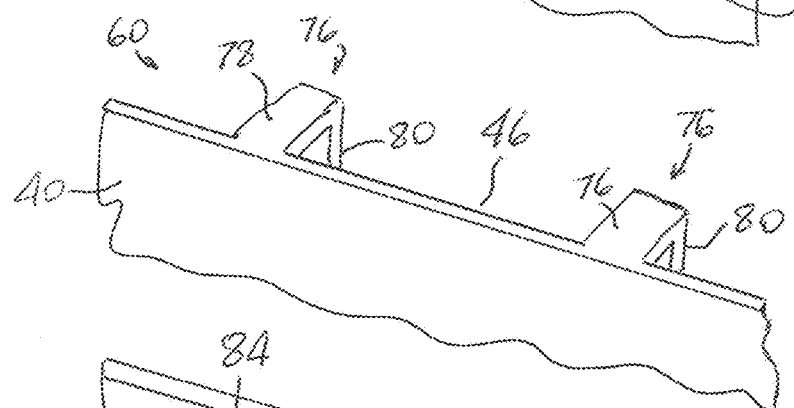

In an example of FIG. 4B, the mounting member 60 can comprise a pair of hooks 76 disposed in a spaced apart relationship with each other along the first edge 46 of the main portion 40. Each hook 76 defines an L-shaped configuration with a first portion 78 disposed generally horizontally during use of the tray 20 and a second portion 80 disposed generally vertically during the use of the apparatus 10 and extending downwardly from the first portion 78 of each hook 76. The hooks 76 can be provided integral with the main portion 40 by being formed or stamped from the same sheet metal blank or being defined during the casting or molding operation.

Figure 4C:
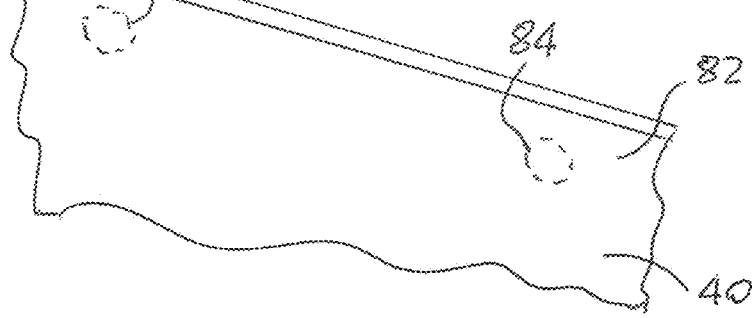

In an example of FIG. 4C, the mounting member 60 can be simply an extension 82 of the main portion 40 and can comprise one or more apertures 84 though a thickness of the mounting member 60.

Figure 4D:
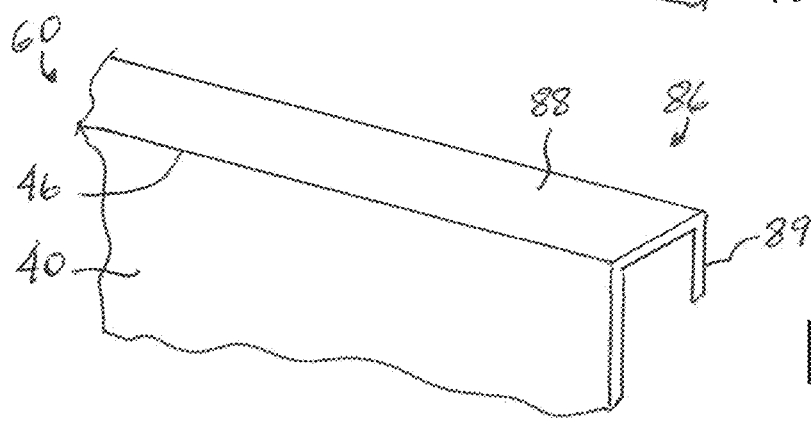

In an example of FIG. 4D, the mounting member 60 can comprise a flange 86 extending generally horizontally during use of the apparatus 10. The flange 86 comprises a first portion 88 disposed generally horizontally during use of the tray 20 and a second portion 89 disposed generally vertically during use of the tray 20 and extending downwardly from the first portion 88 of the flange 86. The flange 86 can be provided integral with the main portion 40 by being formed or stamped from the same sheet metal blank or being defined during the casting or molding operation.

During use, the mounting member 60 directly couples to the tray mounting member or tray support member to be described later in this document. During use, the mounting member 60 also removably couples to the tray mounting member or tray support member. The direct coupling reduces overall costs, although indirect coupling is also contemplated herewithin.

The support arm 90 essentially provides a means for supporting at least a portion of the object 2 thereon. In an example of FIGS. 1A-3D, the support arm 90 is being illustrated as comprising a pair of flanges 96, 98 defining an L-shaped cross-section in a plane normal to a length of the support arm 90. One flange of the pair of flanges, referenced with a numeral 96, is being disposed, during the use of the tray 20, generally horizontally. However, it is also contemplated that the flange 96 can be disposed at an angle to the horizontal or vertical plane, where the distal end 94 of the support arm 90 is disposed higher than the proximal end 92. Another flange 98 is being disposed, during the use of the tray 20, generally vertically and can be positioned at one edge of the flange 96. In the example of FIGS. 1A-3D, a portion of the object 2 is being supported on the flange 96 and is being restricted from a movement in a lateral direction by the flange 98. Thus, the pair of flanges 98 is configured to at least restrict if not completely eliminate a movement of the object 2 either to left or right in FIGS. 1A and 1C.

Figure 5A:
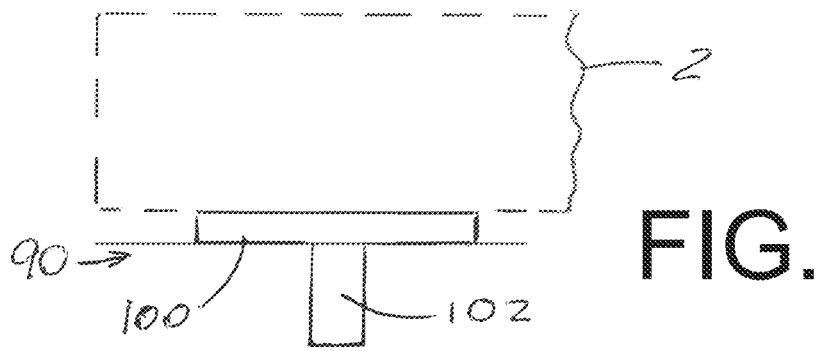
FIGS. 5A-5D illustrate various examples of a support member employed within the tray of FIGS. 1A-3D.

In an example of FIG. 5A, the support arm 90 can comprises a pair of flanges 100, 102 defining a T-shaped cross-section in a plane normal to a length of the support arm 90. One flange, for example such as the flange 100 being disposed, during the use of the tray 20, generally horizontally and another flange 102 being disposed, during the use of the tray 20, generally vertically, with the flange 102 being disposed generally vertically is positioned mediate side edges of the flange 100. A portion of the object 2 is then simply supported on the upper surface of the flange 100.

Figure 5B:
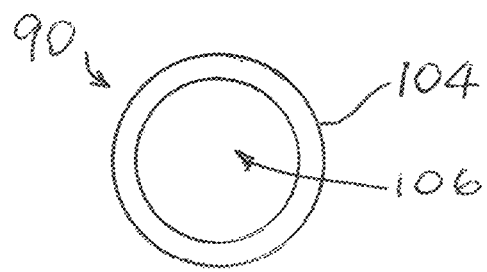

In an example of FIG. 5B, the support arm 90 can be provided as a tubular member 104 with a hollow interior 106. The tubular member 104 can be round, square or of any other tubular shape.

Figures 5C, 5D:
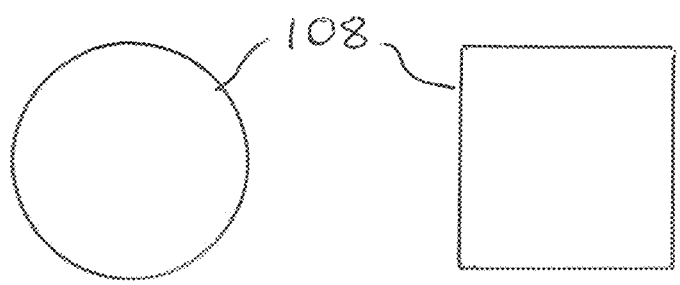

In an example of FIGS. 5C-5D, the support arm 90 can be provided as a rod-shaped member 108 having any one of a round, a square or other cross-section in a plane normal (transverse) to a length of the support arm 90.

In an example, the support arm 90 can be adapted with an arcuately-shaped cross-section in a plane normal to a length of the support arm 90, particularly when the object 2 has a cylindrical or a tubular shape.

The cross-section of the support arm 90 can comprise a combination of different shapes. In one example, the sharp square corners of FIG. 5D can be replaced with curved regions, thus resulting in a peripheral surface of the support arm 90 defined by both straight and curved features. In another example, the L-shaped configuration of the support arm 90 can be replaced with a curved portion connecting opposing edges of the first flange 96 and the second flange 98.

In all examples, the support arm 90 can be welded to the main portion 40, when both the main portion 40 and the support arm 90 are manufactured from metal or can be provided as a one piece-construction with the main portion 40 by a casting forging or molding process.

It would be also understood, that the support arm 90 can be fastened to the main portion 40, for example with a flange (not shown) and mating hole(s) (not shown). Or the end 92 of the support arm 90 can be configured, for example with a threaded bore (not shown), to receive a fastener therethrough.

In at least some examples, the support arm 90 comprises an elongated member with a width or height being smaller than its length.

In all examples, the support arm 90 can be adapted with an optional stop 109 rigidly secured to a distal end 94. The stop 109, when used, is shaped and/or sized to prevent the object 2 from falling off from the support arm 90 when moving along the length of the support arm 90. The stop 109 can be provided integral with the support arm 90 by being formed or stamped from the same sheet metal blank as the support arm 90 or being defined during a casting, a forging or a molding operation of the support arm 90 or the bracket 30, 32. Although the stop 109 has been illustrated as a plate-shaped member with a notched corner, it can be also provided for example as a pin-shaped member a round shaped member, or as a flange at the end of the first flange 96 and being smaller in height than a height of the second flange 98. It would be understood that the tray 20 is being illustrated as comprising a pair of stops 109, although only one support arm 90 can be adapted with the stop 109.

The first portion 112 of the guide 110 and the second portion 114 of the guide 110 can be a tubular member with a hollow interior, as is best shown in FIGS. 1A-3D. One tubular member, for example such as the first portion 112 has a peripheral surface thereof being sized to pass through a hollow interior 116 of the other tubular member 114. The first portion 112 is rigidly secured to at least one of the main portion 40 and the support arm 90 of the first bracket 30 either by welding process, a fastening arrangement, or integrated therewith by way of a casting, a forging or a molding process. Likewise, the second portion 114 can be rigidly secured to at least one of the main portion 40 and the support arm 90 of the second bracket 32 in a similar manner.

It can be also said that since the first portion 112 passes through the second portion 114, they are interlocked with each other, in terms of at least maintaining the main portion 40 of the first bracket 30 in a generally same plane as a plane of the main portion 40 of the second bracket 32, although some deviation from such planar alignment is allowed, providing that the deviation does not hinder linear movement of one bracket in a relationship to the other bracket. Also, the second portion 114 is being illustrated as guiding the first portion 112 to move in such linear direction.

In other words, the second portion 114 of the guide 110 can comprise the second tubular member being sized, in cross-section, larger or a smaller than a cross-section of the first tubular member 112, so that first and second tubular members, 112 and 114 respectively, are movable in the linear direction while one tubular member from the first and second tubular members is disposed within another tubular member from the first and second tubular members, 112 and 114 respectively.

However, the first portion 112 and the second portion 114 do not have to be limited to tubular members and can be provided in other cross-sectional shapes. In one non-limiting example, the cross-section of each first and second portions can be a J-shaped cross-section, an L-shaped cross-section or any other male/female coupling of two portions that would provide sufficient guidance to enable a linear movement and maintain the two main portions 40 in a generally planar relationship with each other. Furthermore, the first portion 112 can be provided as a solid member when the second portion 114 is provided as a tubular member.

In an embodiment, the tray 20 can comprise an optional device 130 configured to fix a distance between support arms 90 of each bracket 30, 32 during the use of the tray 20.

In a non-limiting example, such device 130 can comprise a threaded aperture 132 in one of the first and second portions of the guide 110 and a fastener 134 having a threaded portion thereof being configured to operatively engage the threaded aperture 132 and being configured to abut, at a free end thereof, a peripheral surface of another one of the first and second portions of the guide 110 and apply a force onto the peripheral surface, where the force being sufficient to prevent the movement of one portion of the guide 110 in the linear direction relative to another portion of the guide 110. Such fastener 134 can be a thumb screw for use without any tools. In operation, once the distance between the flanges 98 of each support arm 90 or a distance between the support arms 90 without such flange 98 is adjusted based on the dimension of the object 2, the fastener 134 is advanced to apply the force onto one portion, for example such as the portion 112, with the force being sufficient to essentially prevent unintended movement of the first and second portion of the guide 110 therebetween.

In one non-limiting example, the threaded aperture 132 and the fastener 134 can be replaced with a frictional engagement between the first portion 112 and the second portion 114 of the guide 110.

Figure 3B:
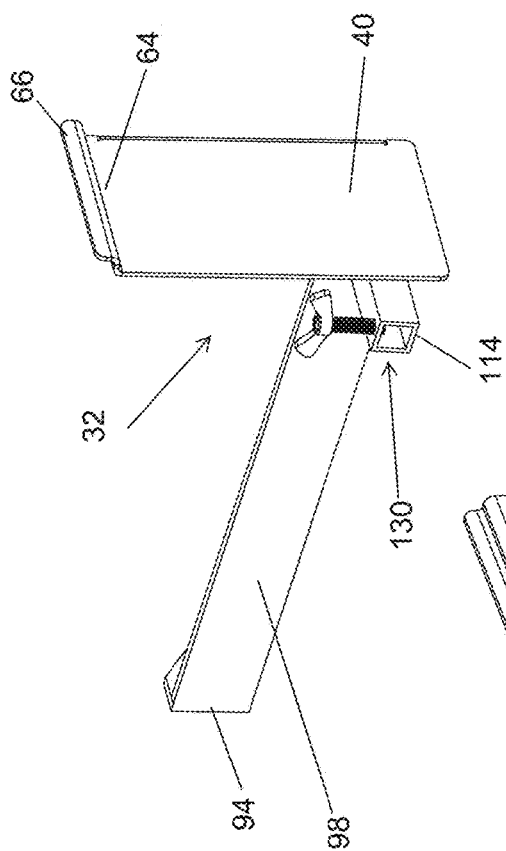
FIGS. 3A-3D illustrate 3D views of another bracket of the tray of FIGS. 1A-1D.
Figure 3D:
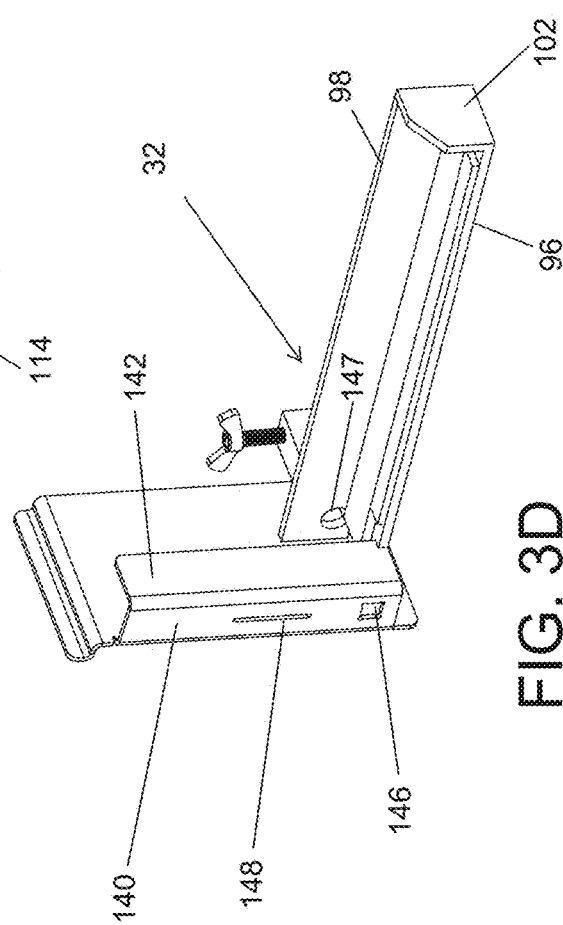
Figure 3A:
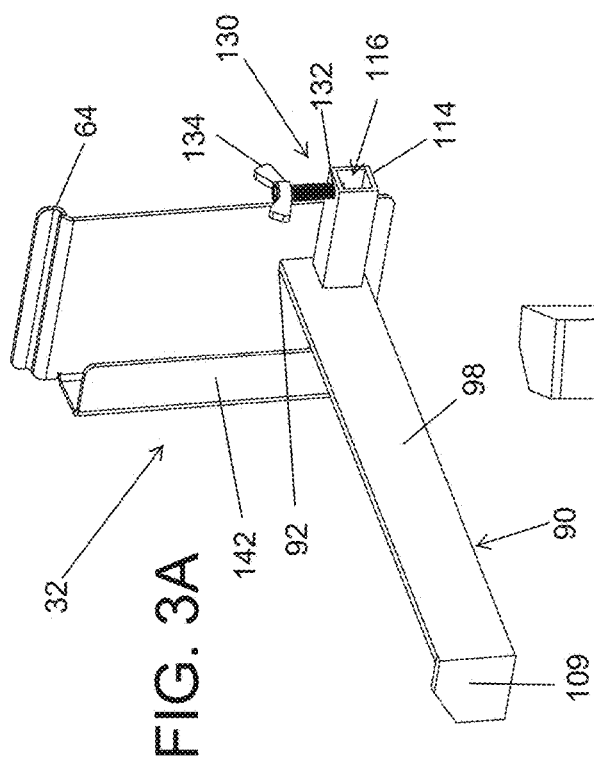
Figure 3C:
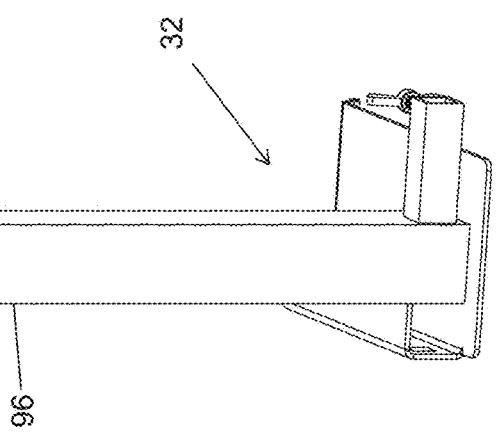

One or both of the brackets 30, 32 can be adapted with one or more flanges. In a further reference to FIGS. 1A-3D, each bracket 30, 32 can be adapted with a flange 140, so that during use of the tray 20, the flanges 140 on opposing brackets 30, 32 are disposed generally parallel with each other. When the flange 140 is provided, the flange 140 is adapted with an aperture 146 sized and shaped to pass the first guide member 112 therethrough. Another aperture 146 is then also provided in the opposing flange 140 of the second bracket 32. Furthermore, the opposing second bracket 32 is also adapted with a second aperture 147 formed through the flange 98 of the support arm 90 and in alignment with a second guide portion 114, as is best shown in FIG. 3D. It would be understood that such second aperture 147 may be required when the support arm 90 is configured in an accordance with examples of FIGS. 5A-5D.

For the reasons to be explained later, the flange 140 can be adapted with an elongated aperture or slot 148 formed through a thickness thereof. The elongated aperture or slot 148 is sized and shaped to allow passage of the strap 150 therethrough. The strap 150 can have ends thereof being releasably securable to each other during use of the tray 20. The strap 150 can be adapted with a fastener or clasp 152 to selectively secure and release the ends of the strap 150. In a non-limiting example, such fastener 152 can be a hook and loop fastener. The strap 150 can be also provided as a cable, chain or a wire with a suitable fastener.

One or both brackets 30 and 32 can be adapted with a second flange 142 extending from a free edge of a respective flange 140 and being disposed substantially parallel to a surface of a respective main portion 40. When both flanges 140 and 142 are provided, the flange 140 can be referred herein as a first leg 140 of an L-shaped flange and the second flange 142 can be referred to as a second leg of the L-shaped flange.

The support arm 90 of any configuration can be adapted with a cushioning member 160 being disposed on the support arm 90 and, more particularly, on a surface of the first flange 96, in an abutting relationship with a bottom portion of the object 2 being supported thereon. The cushioning member 160 can comprise a resiliently compressible material. The cushioning member 160 can comprise a length thereof being generally equal to a length of the respective support arm 90. The cushioning member 160 does not have to be a continuous single-piece member and can comprise one or more portions or separate members disposed in a spaced apart relationship with each other on the respective support arm 90.

Thus, in an embodiment, an adjustable tray 20 comprises a first bracket 30. The first bracket 30 comprises a first main portion 40 disposed generally vertically during use of the tray 20, a first mounting member 60 disposed at a first edge 46 of the first main portion 40, a first L-shaped support arm 90 having a proximal end 92 thereof being rigidly secured to the first main portion 40 at or next to a second edge 48 thereof, the second edge 48 being opposite to the first edge 46, the first L-shaped support arm 90 extending outwardly from the first main portion 40, a first flange 96 of the first L-shaped support arm 90 being disposed generally horizontally during the use of the tray 20 and a second flange 98 of the first L-shaped support arm 90 being disposed generally vertically, a first stop 109 being rigidly secured to the second end 94 of the first L-shaped support arm 90, a first L-shaped flange with a first leg 140 being rigidly secured to the first main portion 40 at a third edge 50 thereof and extending in a direction of the first L-shaped support arm 90, and a second leg 142 disposed generally parallel to the first main portion 40, a first aperture 146 formed through a thickness of the first leg 140 of the first L-shaped flange, a second aperture 148 formed through a thickness of the first leg 140 of the first L-shaped flange at a distance from the first aperture 146, and a first guide 112 with a portion thereof being rigidly secured to at least one of the first main portion 40 and the first L-shaped support arm 90, the first guide 112 extending through the first aperture 146 in a direction away from the second flange 98 of the first L-shaped support arm 90. The adjustable tray 20 of this embodiment further comprises a second bracket 32. The second bracket 32 comprises a second main portion 40 disposed generally vertically during the use of the tray 20, a second mounting member 60 disposed at a first edge 46 of the second main portion 40, a second L-shaped support arm 90 having a proximal end 92 thereof being rigidly secured to the second main portion 40 at or next to a second edge 48 thereof, the second edge 48 of the second main portion 40 being opposite to the first edge 46 of the second main portion 40, the second L-shaped support arm 90 extending outwardly from the second main portion 40, a first flange 96 of the second L-shaped support arm 90 being disposed generally horizontally during the use of the tray 20 and a second flange 98 of the second L-shaped support arm 90 being disposed generally vertically, a second stop 109 rigidly secured to the second end 94 of the second L-shaped support arm 90, a second L-shaped flange with a first leg 140 being rigidly secured to the second main portion 40 at a third edge 50 thereof and extending in a direction of the second L-shaped support arm 90, and a second leg 142 being disposed generally parallel to the second main portion 40, a first aperture 146 formed through a thickness of the first leg 140 of the second L-shaped flange, a second aperture 147 formed through the second flange 98 of the second L-shaped support arm 90, a third or an elongated aperture 148 formed through a thickness of the first leg 140 of the second L-shaped flange at a distance from the first aperture 146, and a second guide 114 with a portion thereof being rigidly secured to at least one of the second main portion 40 and the second L-shaped support arm 90, the second guide 114 extending in a direction away from the second flange 98 of the second L-shaped support arm 90, the second guide 114 comprising a hollow interior aligned with the first aperture 146 of the second L-shaped flange and with the second aperture 147. The adjustable tray 20 additionally comprises a strap 150 passed, at least during the use of the tray 20, through the second aperture 148 in the first leg 140 of the first L-shaped flange and the first leg 140 of the second L-shaped flange, the strap 150 having ends being releasably securable to each other. In this embodiment, the first guide 112 passing, during the use of the tray 20, through the hollow interior 116 of the second guide 114 and through the first aperture 146 of the second L-shaped flange and the second aperture 147, so that the first bracket 30 and the second bracket 32 are movable in a linear direction relative to one another in order to vary a distance, in a horizontal direction, between the second flange 98 of the first L-shaped support arm 90 and the second flange 98 of the second L-shaped support arm 90. In other words, the first guide 112 and the second guide 114 provide a guidance in adjusting a width of the adjustable tray 20. FIGS. 1A and 1B illustrate a configuration of the tray 20 where the first bracket 30 and the second bracket 32 are being spaced apart further from each other to accommodate objects 2 of larger sizes. FIGS. 1C and 1D illustrate a configuration of the tray 20 where the first bracket 30 and the second bracket 32 are being spaced apart closer to each other to accommodate objects 2 of smaller sizes.

FIGS. 1A-1D also illustrate (when presented without reference numerals and further in a conjunction with the relevant Brief Description of the Drawings) an ornamental design of an adjustable tray as an article of manufacture.

FIGS. 2A-2D also illustrate (when presented without reference numerals and further in a conjunction with the relevant Brief Description of the Drawings) an ornamental design of a bracket for an adjustable tray as an article of manufacture.

FIGS. 3A-3D also illustrate (when presented without reference numerals and further in a conjunction with the relevant Brief Description of the Drawings) an ornamental design of a bracket for an adjustable tray as an article of manufacture.

During use of the tray 20, it is intended that the tray 20 directly couples to a structure or a member in a position to receive and at least support one or more objects 2 on the support arms 90.

Figure 8:
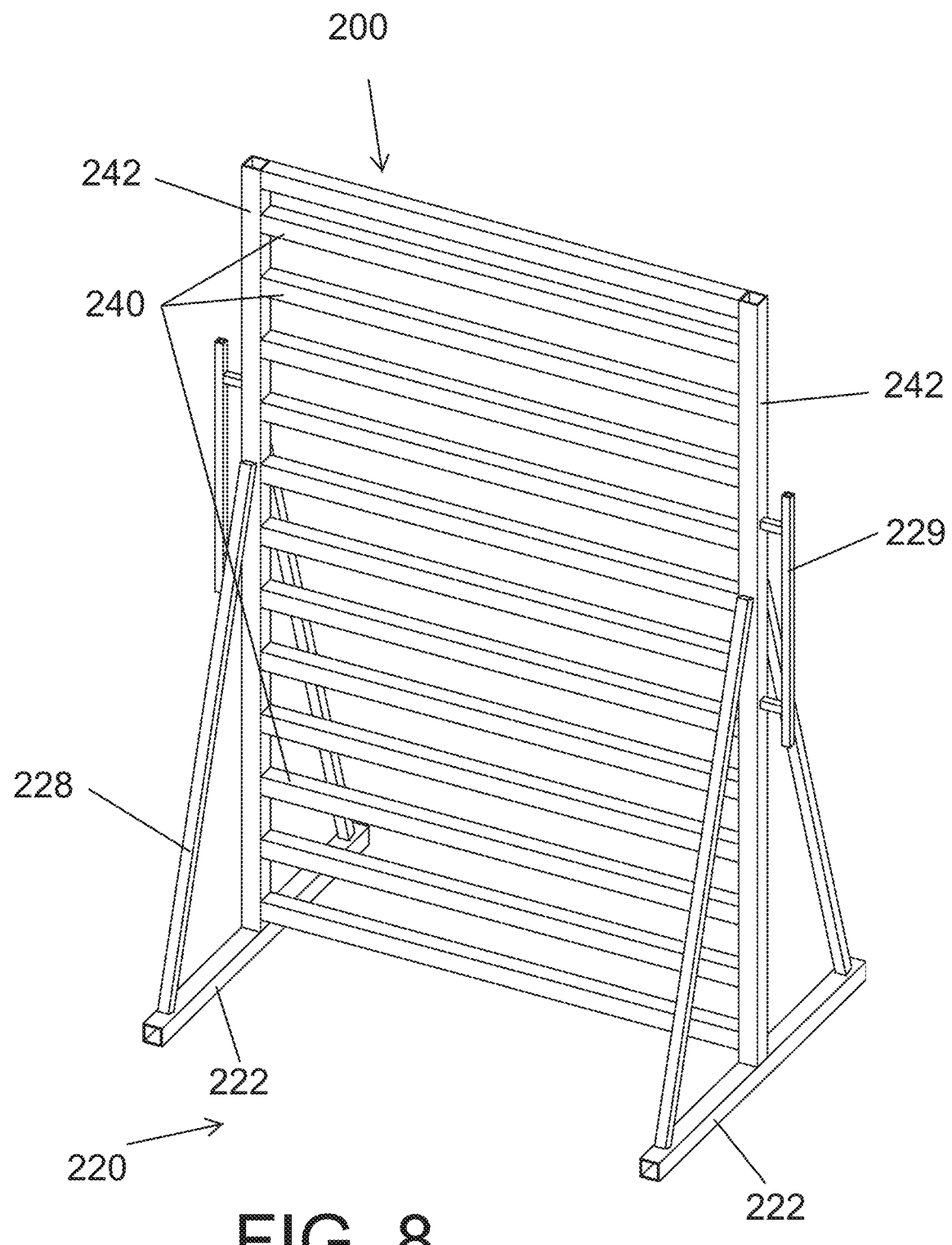
FIG. 8 illustrates a 3D view of a tray mounting member in an accordance with an exemplary embodiment.

In embodiments of FIGS. 6 and 9, the tray mounting member or tray support member 200 comprises a panel 210 with a pair of surfaces spaced apart from each other to define a thickness of the panel 210 and with an orthogonal grid of apertures 212 provided as through apertures through a thickness of the panel 210 or bores/cavities usable from one surface of the panel 210 only. Such panel 210 can be also referred to as a pegboard member. In a further reference to FIG. 6, the panel 210 is mounted in a rack-shaped manner on a base 220 that can be provided as a pair of elongated members 222 with wheels 224 or as a one-piece member, either in a wheeled manner, as is shown, for example in FIG. 7. In other words, the base 220 can comprise four wheels 234. The base 220 can be also configured in a stationary meaner, without the wheels 224, as is best illustrated in FIG. 8. The panel 210 can be provided of a sufficient rigidity to be upstanding in an upright position without use of a separate peripheral frame or can be encased by a frame, for example such as a frame 236 of FIGS. 7, 10-12, or one or more reinforcing members (not shown).

It would be understood that the panel 210 of FIG. 9 can be mounted to a vertical wall or any other structure.

The mounting member of FIGS. 6 and 8 can be used with the hooks 70 of FIG. 4A or the mounting member 82 of FIG. 4C.

In an embodiment of FIG. 7, the tray mounting member or tray support member 200 comprises a pair of panels 230 that are mounted on a one-piece base 220 but can be also mounted on separate elongated members 222 of FIG. 6. The panels 230 are illustrated as being positioned at an incline to each other but can be also positioned substantially vertically in a back-to-back relationship with each other. In other words, the free top edge 238 of one panel 230 abuts or is positioned in a close proximity to a free top edge 238 of an adjoining panel 230. The bottom edge 239 of each panel 230 is rigidly secured to one edge of the base 220 either in a permanent or a semi-permanent (removable) manner. In other words, the panels 230 of FIG. 7 define a generally triangular shape in a vertical plane. Each panel 230 comprises a plurality of elongated slots 232 in the thickness of the panel 230, each elongated slot 232 being in an open communication with an exterior surface of the panel 230, the slots 232 being disposed in a spaced apart relationship with each other and generally horizontally during. The slots 232 are sized and shaped to receive the flange 62 of FIGS. 1A-3D. The panels 230 can be also referred to as a slatwall member. The slots 232 can be integrated into the panel 230, for example by a machining process. The panel 230 can be also provided as a plurality of individual members (rails) 235 mounted within a peripheral frame 236. The individual members (slats or rails) 235 are being spaced apart with each other in the generally vertical direction, each elongated rail 235 from the plurality of elongated rails 235 being disposed in a generally horizontal direction. One or both longitudinal edges of each rail 235 can be configured to define the slot 232 when the rails 235 are installed within the frame 236. It would be understood that the flange 62 of FIGS. 1A-3D will be used with the slatwall type mounting member.

In an embodiment of FIG. 8, the tray mounting member or tray support member 200 comprises elongated members 240 disposed generally horizontally and being spaced apart with each other in a vertical plane. There is also a pair of side members 242, each side member 242 is rigidly coupled to one end of each elongated member 240, either permanently or releaseably. The permanent coupling can be achieved, for example, by a welding process. Releaseable coupling can be achieved by use of fasteners (not shown) or equivalent. Support braces 228 can be also provided or the side members 242 can be configured to upstand on the base 220 without any bracing. One or more handles 229 can be further provided. At least the side members 242 can be mounted to a pair of elongated members 222 that can be further adapted with wheels 224. The tray mounting member or tray support member 200 of FIG. 8 is configured to complement the mounting member 76 of FIG. 4B or mounting member 86 of FIG. 4D.

FIG. 10 illustrates another embodiment of a panel 230' of a slatwall type surrounded by a peripheral frame 236' that can be mounted to a vertical wall or any other structure.

Figure 11:
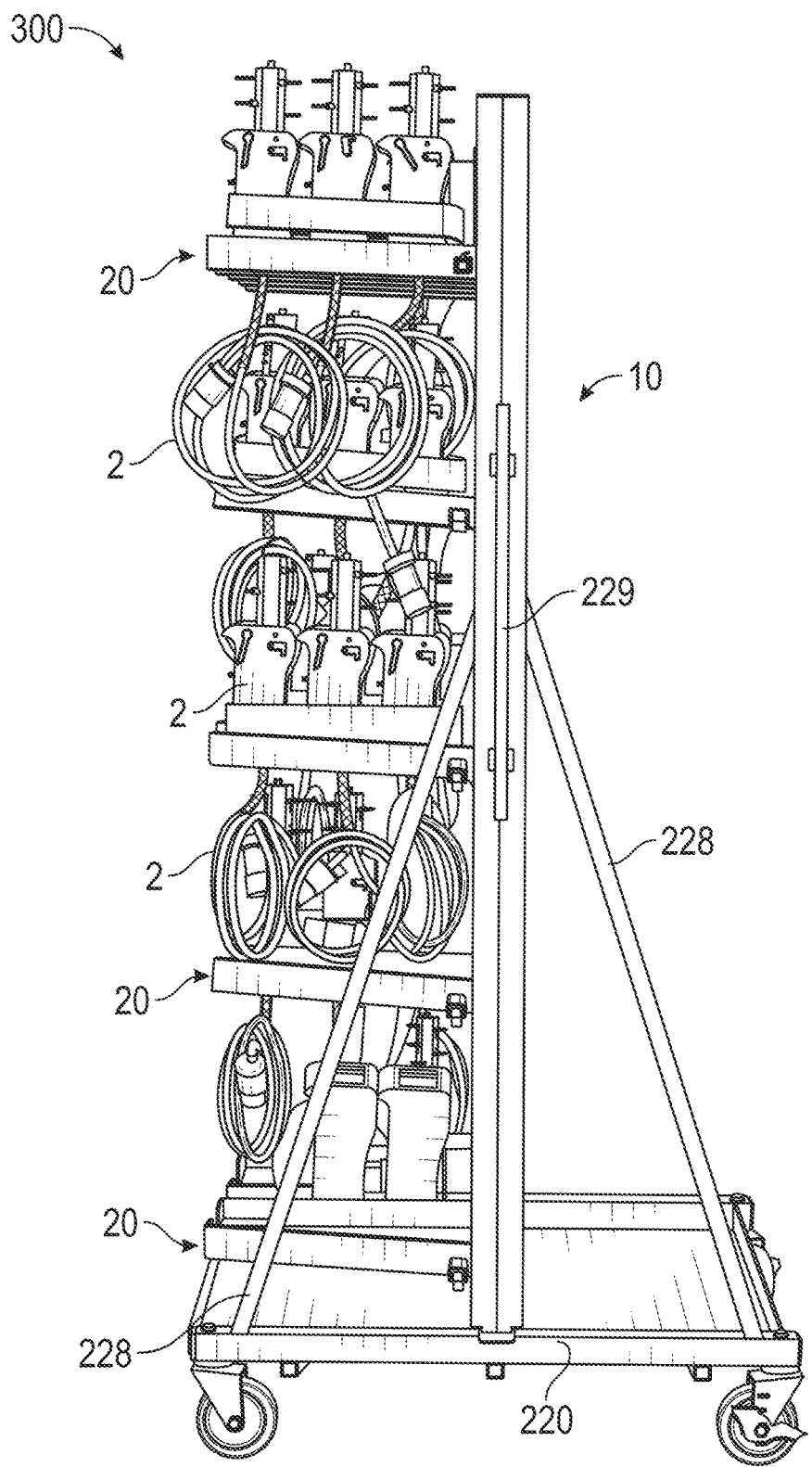
FIG. 11 illustrates a 3D view of a storage rack in an accordance with an exemplary embodiment.
Figure 12:
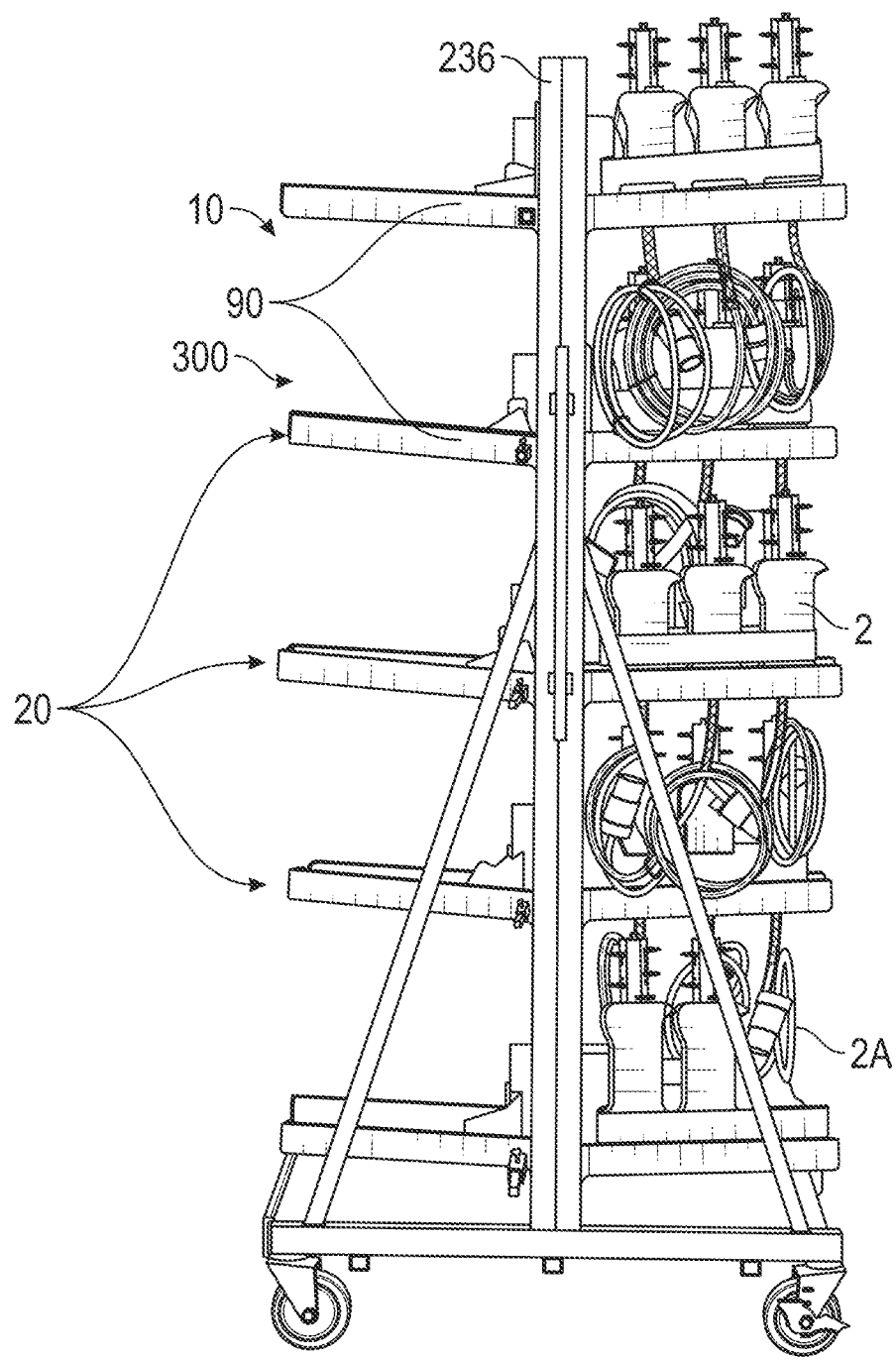
FIG. 12 illustrates a 3D view of a storage rack in an accordance with an exemplary embodiment.
Figure 13:
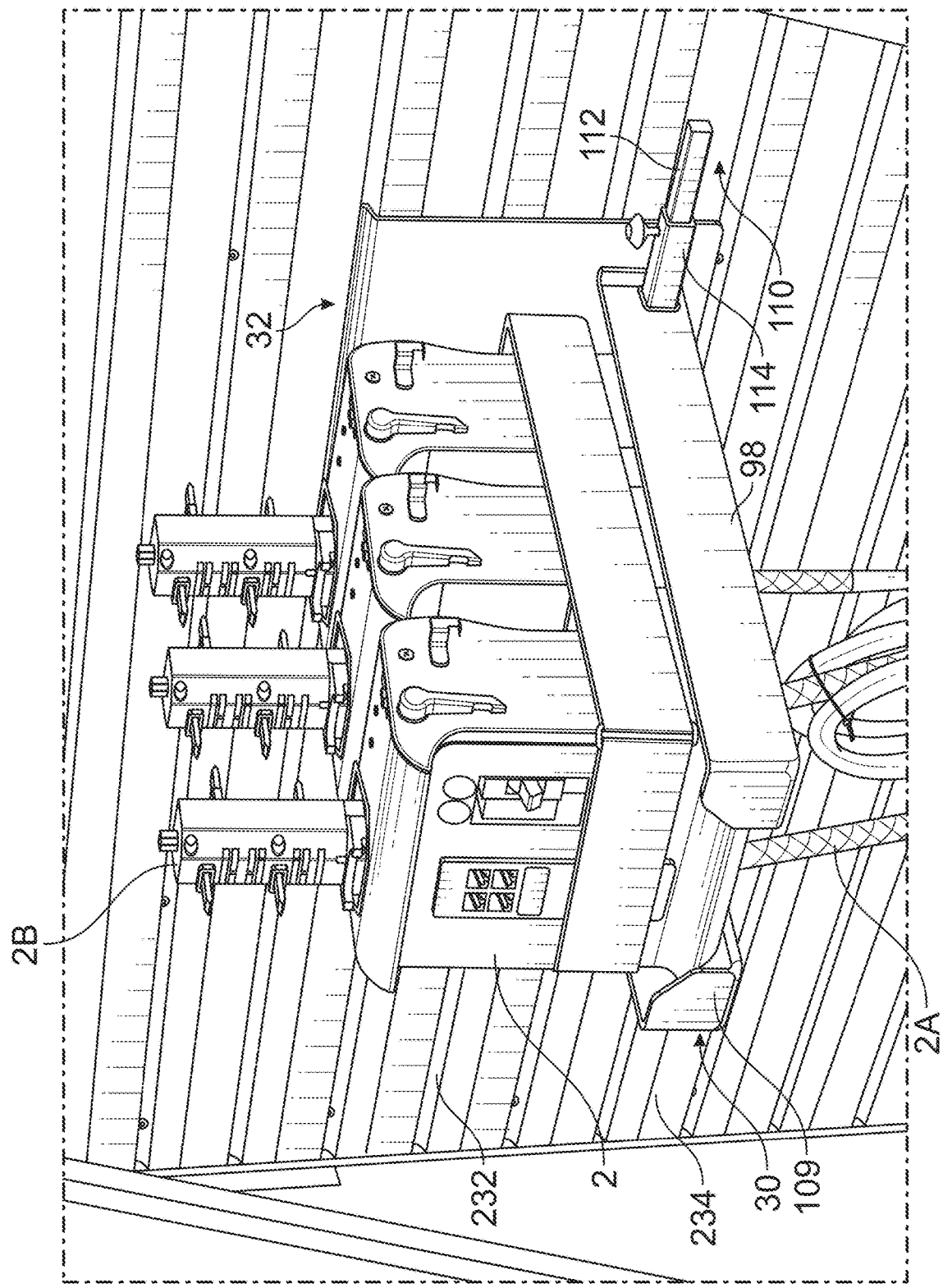
FIG. 13 illustrates a enlarged 3D view of the tray of FIGS. 1A-1D mounted on a tray mounting member of FIGS. 11-12, partially illustrated.

FIGS. 11-13 illustrate an embodiment of a tray mounting member or tray support member 200 comprises a pair of panels 230 that are mounted on a one-piece base 220 and further comprises two or more braces 228 having one end thereof being rigidly secured to the base 220 at one side edge thereof in a spaced apart relationship with the one end of the each tray support member 200, and an opposite end thereof being rigidly secured to one or both tray support members 200. Two or more braces 228 are being inclined relative to an exterior surface of the each tray support member 200. One or more handles 229 can be further provided.

FIGS. 11-12 also illustrates that the support arms 90 can be tilted in a vertical plane even when the panels 210 or 230 are mounted substantially vertically. In other words, the distal end 94 of each support arm 90 can be disposed higher, in a vertical plane, than the proximal end 92. Such orientation of the support arms 90 biases the objects 2 stored thereon toward the tray mounting member or tray support member 200. This is particularly advantageous during movement of the tray mounting member or tray support member 200 with the objects 2 positioned or mounted thereon.

It would be understood that the tray mounting or tray support members of FIGS. 6-13 provide a means for mounting the one or more trays 20 in a generally vertical plane.

It would be further understood that the embodiments of FIGS. 11-13 provide a rack 300 employing one or more above described adjustable trays 20 and configured to at least support a plurality of object 2 of fixed or variable width. The rack 300 can be also referred to as an apparatus.

Such apparatus 300 is configured to at least store objects 2 of varying sizes and comprises one or more trays 20 configured to adjustably support objects 2 and a means for mounting the one or more trays 20 in a generally vertical plane. It can be also said that the apparatus 300 store objects 2 of varying sizes.

In an example of FIGS. 11-14, the object 2 can be a plug-in unit used with overhead track busways in a power distribution application. The plug-in unit 2 used in track busways for overhead power distribution comprises a housing, a connector 2B extending from a top surface of the housing and a power cable 2A extending from a bottom surface of the housing in a direction being opposite to a direction of the connector 2B. In some cases, track busways can be attached to a vertical wall.

FIG. 13 further illustrates that a plurality of plug-in units 2 can be mounted on a single tray 20 in a series with each other along the length of the support arms 90. Although three plug-in units 2 have been illustrated, more or less plug-in units 2 will be applicable herein and may require pre-selection of the lengths of the support arms 90. It is also contemplated that a portion of the front plug-in unit 2 may extend beyond the distal end 94 of the support arms 90 provided without the stop member 109. When a plurality of plug-in units are supported on the support arms 90, the plug in units 2 can be provided in different sizes. Furthermore, the strap 150 is being illustrated in its operative position as encircling the plug-in units 2. It has been found that it is desired to at least minimize if not eliminate unintended movement and rattling of the plug-in units 2 during transport. Thus, the strap 150 at least minimizes if not eliminates such unintended movement of the plug-in units 2. This unintended movement is additionally or alternatively at least minimized by the vertically disposed second flanges 98 and the end stops 109. Although, the strap 150 can be used without the vertically disposed second flanges 98 and the end stops 109 or the vertically disposed second flanges 98 and the end stops 109 can be used without the strap 150. The tilted support arms 90 bias the plug-in units 2 toward the main portions 40 and further aid in at least preventing the unintended movement the of the plug-in units 2 during transport. The cushioning members 160 aid in preventing rattling of the plug-in units 2, as well as preventing a direct contact between the plug-in units 2 and the first flanges 96 of the support arms 90. The device 130 can be used to temporarily fix the width between the opposing flanges 98 after the brackets 30, 32 are adjusted to accommodate the sizes of the plug-in units 2.

The space or gap between the edges of the first flanges 96 of the opposing support arms 90 also advantageously allows nesting of the plug-in units, or similar objects 2. It is contemplated herewithin that such space or gap can be reduced or even closed by using first flanges 96 of a greater width, when it is also necessary to store a plurality of objects 2 in a direction between second flanges 98.

Figure 14:
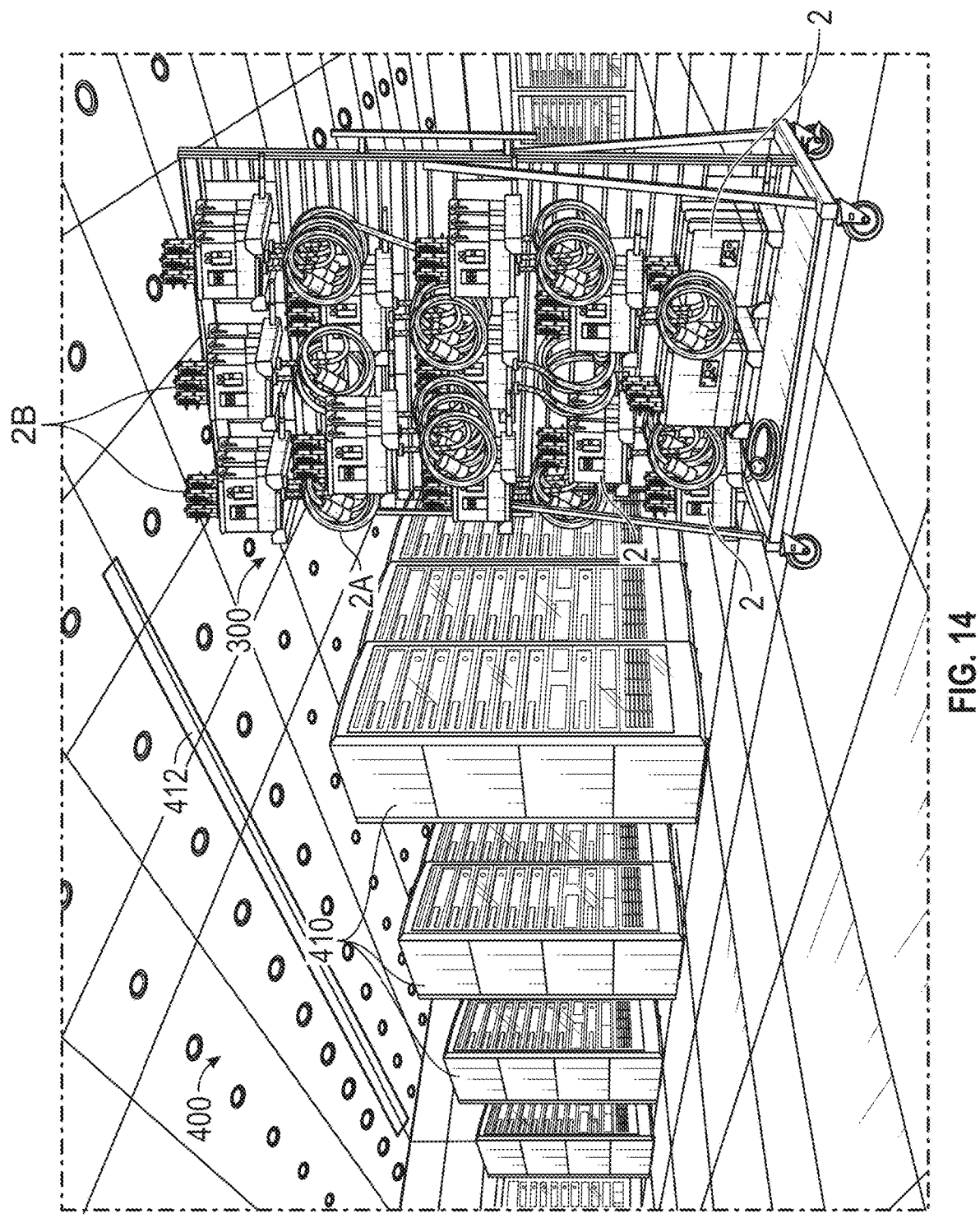
FIG. 14 illustrates a 3D view of an exemplary use of the storage rack of FIG. 12.

FIG. 14 illustrates use of the rack 300 with plug-in units 2 within a data center 400 employing data storage units 410 where the plug-in units 2 are used to connect, by way of power plug and cord 2A and the connector 2B, the data storage units 410 to track busways 412. The rack 300 is advantageous, in accordance with any of the above described mobile embodiments, in quickly delivering the unpacked plug-in units 2 to the expansion areas within the data center 400 so as to activate the newly added data storage and/or processing units 410 without delays. FIG. 14 also illustrates a nested arrangement of the trays 20 and plug-in units 2 where the cords 2A are nested within the connectors 2B so as to at least prevent interference therebetween and at least prevent if not completely eliminate any difficulties of removing one or more plug-in units 2 for use or positioning them on the trays 20 for storage and future use.

Thus, in an embodiment, a method is provided for storing plug-in units of various widths, the plug-in units used in track busways for power distribution. The method comprises the steps of providing a rack 200, releaseably coupling trays 20 to the rack 200, adjusting a width of each tray 200 in a relationship to a width of plug-in units 2 to be supported thereon, and placing one or more plug-in units 2 onto the each tray 20. The method can further comprise a step of securing, with a strap 150, one or more plug-in units 2 placed onto each tray 20. The step of securing the one or more plug-in units 2 can comprise a step of forming, with the strap 150, a loop, a step of positioning the one or more plug-in units 2 within the loop, and a step of releaseably securing ends of the strap 150 therebetween. The method can further comprise a step of at least restricting, with side flanges 98 on each tray 20, a side-to-side movement of the one or more plug-in units 2 during a movement of the rack 300.

In an embodiment, a method of transporting a plurality of plug-in units of various widths that are used in track busways for power distribution, comprises the steps of providing a mobile rack, releaseably coupling trays to the mobile rack, adjusting a width of each tray in a relationship to a width of plug-in units to be supported thereon, placing one or more plug-in units from the plurality of plug-in units onto at least one tray, securing, with a strap, the one or more plug-in units, and moving the mobile rack with the plurality of plug-in units secured thereon.

In an embodiment, a method of transporting a plurality of plug-in units of various widths that are used in track busways for power distribution, comprises the steps of providing a mobile rack, releaseably coupling trays to the mobile rack, adjusting a width of each tray in a relationship to a width of plug-in units to be supported thereon, placing one or more plug-in units from the plurality of plug-in units onto the each tray; at least restricting, with side flanges on the each tray, a side-to-side movement of the one or more plug-in units during a movement of the rack, and moving the mobile rack with the plurality of plug-in units secured thereon.

In an embodiment, a data center comprises data storage units, overhead power track busways, plug-in units mechanically and electrically coupled, with a connector on each plug-in unit, to the track busways and having a power cable suspending from each plug-in unit for a connection to one data storage or processing unit, and one or more storage racks disposed within the data center, the one or more storage racks comprising adjustable trays to store plug-in units thereon. The storage racks and trays can be any of the above described examples.

Although the present subject matter has been described and illustrated in terms of storing and transporting plug-in units for power distribution, it will be apparent to those skilled in the art, that the present various disclosures may be applied to other objects.

In an embodiment, the object can be a cardboard box, a bin or a storage container for use in residential, commercial or industrial applications. The mounting members of FIGS. 9 and/or 10 can be simply and conventionally affixed to a vertical wall (not shown) allowing the user to store boxes or containers of different sizes while allowing the user to adjust or change the tray width to accommodate future boxes, bins or containers of different sizes. Mounting members of FIGS. 6-8 and 11-12 can be also provided in ether a stationary or mobile configuration.

In an embodiment, the stationary or mobile rack can be used to display and/or store home office equipment in a store. Thus, home office equipment system including a computer, a printer, a modem/router, a keyboard and other various accessories can be easily and positioned on trays 20 adjusted to accommodate a width/size of each object. This arrangement not only facilitates ease of displaying or storing different objects on a single rack but also enables a shopper to visualize the complete home office system as well as positions objects of varying sizes in a grouped arrangement as compared to a conventional storage and display of each object individually.

In an embodiment, the stationary or mobile rack can be used in a manufacturing facility to store and move to-be-processed raw material, for example such as bar or tubular stock, from a storage area to a related equipment or machinery. Any unprocessed material can be easily returned to the storage area or the rack can be reconfigured for storage of a different to-be-processed raw material. Such raw material can be used with the support arms of FIGS. 5A-5D and can be further secured with the strap 150 or similar member during transport/movement.

In an embodiment, an apparatus that at least stores objects of varying sizes comprises adjustable trays configured to support the objects at bottom surfaces thereof and a means for mounting the trays in a generally vertical plane.

A feature of this embodiment is that each tray comprises two brackets mounted, during use of the apparatus, in a side-by-side relationship with each other, each bracket from the two brackets comprising a main portion, a mounting member disposed at one edge of the main portion, and a support arm having a proximal end thereof being rigidly secured to the main portion, the support arm extending outwardly from the main portion; where the tray further comprises a guide having a first portion thereof securely coupled to one bracket from the two brackets and a second portion thereof securely coupled to another one bracket from the two brackets, the first portion and the second portion configured to move in a linear direction relative to one another while being interlocked with each other.

A feature of this embodiment is that the main portion can comprise a pair of surfaces spaced apart to each other to define a thickness of the main portion.

A feature of this embodiment is that the thickness can be uniform throughout the main portion.

A feature of this embodiment is that the support arm can comprise a pair of flanges defining an L-shaped cross-section in a plane normal to a length of the support arm, one flange of the pair of flanges being disposed, during the use of the apparatus, generally horizontally and another flange of the pair of flanges being disposed, during the use of the apparatus, generally vertically, where the another flange being disposed generally vertically is positioned at one edge of the one flange.

A feature of this embodiment is that the support arm comprises a pair of flanges defining a T-shaped cross-section in a plane normal to a length of the support arm, one flange of the pair of flanges being disposed, during the use of the apparatus, generally horizontally and another flange of the pair of flanges being disposed, during the use of the apparatus, generally vertically, where the another flange being disposed generally vertically is positioned mediate side edges of the one flange.

A feature of this embodiment is that the support arm can be adapted with a stop being rigidly secured to a distal end of a respective support arm.

A feature of this embodiment is that the support arm comprises an elongated member.

A feature of this embodiment is that the elongated member comprises a tubular cross-section in a plane transverse to a length of the elongated member.

A feature of this embodiment is that the elongated member is solid throughout.

A feature of this embodiment is that the first portion of the guide and the second portion of the guide is a tubular member with a hollow interior, one tubular member having a peripheral surface thereof being sized to pass through a hollow interior of another tubular member.

A feature of this embodiment is that the apparatus can further comprise a device configured to fix a distance between support arms during the use of the apparatus.

A feature of this embodiment is that the device comprises a threaded aperture in one of the first and second portions of the guide and a fastener having a threaded portion configured to operatively engage the threaded aperture and being configured to abut, at a free end thereof, a peripheral surface of another one of the first and second portions of the guide and apply a force onto the peripheral surface, the force being sufficient to prevent a movement of the one portion of the guide in the linear direction relative to another portion of the guide.

A feature of this embodiment is that the fastener can be thumb screw.

A feature of this embodiment is that the apparatus can further comprise a pair of flanges disposed substantially paralegal with each other, each flange from the pair of flanges extending, substantially perpendicular, from the main portion of a respective bracket; a pair of elongated apertures, each from the pair of elongated apertures formed through a thickness of a respective flange; a strap passed through each elongated aperture; and a fastener configured to selectively secure ends of the strap therebetween.

A feature of this embodiment is that the fastener can be a hook and loop fastener.

A feature of this embodiment is that the apparatus can further comprise a pair of additional flanges, each of the pair of additional flanges extending from a free edge of a respective flange and being disposed substantially parallel to a surface of a respective main portion.

A feature of this embodiment is that the mounting member can comprise a flange extending generally horizontally during use of the apparatus, the flange comprising a first portion disposed generally horizontally during use of the apparatus and a second portion disposed generally vertically during the use of the apparatus and extending upwardly from the first portion of the flange, the first and second portions of the flange defining an L-shaped configuration of the flange in a plane normal to a length thereof.

A feature of this embodiment is that a length of the flange can be about equal to a length of the one edge.

A feature of this embodiment is that the mounting member can comprise a pair of hooks disposed in a spaced apart relationship with each other along the one edge of the main portion, each hook from the pair of hooks defines an L-shaped configuration with a first portion disposed generally horizontally during use of the apparatus and a second portion disposed generally vertically during the use of the apparatus and extending upwardly from the first portion of the each hook.

A feature of this embodiment is that the mounting member can comprise one or more apertures though a thickness of the mounting member.

A feature of this embodiment is that the mounting member can comprise a flange extending generally horizontally during use of the apparatus, the flange comprising a first portion disposed generally horizontally during use of the apparatus and a second portion disposed generally vertically during the use of the apparatus and extending downwardly from the first portion of the flange.

A feature of this embodiment is that the mounting member can comprise a pair of hooks disposed in a spaced apart relationship with each other along the one edge of the main portion, each hook from the pair of hooks defines an L-shaped configuration with a first portion disposed generally horizontally during use of the apparatus and a second portion disposed generally vertically during the use of the apparatus and extending downwardly from the first portion of the each hook.

A feature of this embodiment is that each of the first portion of the guide comprises a first tubular member and wherein the second portion of the guide comprises a second tubular member being sized, in cross-section, larger or a smaller than a cross-section of the first tubular member, so that first and second tubular member movable in the linear direction while one tubular member from the first and second tubular members is disposed within another tubular member from the first and second tubular members.

A feature of this embodiment is that the apparatus can further comprise two cushioning members, each cushioning member from the two cushioning members being disposed on respective arm in an abutting relationship with the bottom surface of one or more plug-in units being supported on the respective arm during use of the apparatus.

A feature of this embodiment is that the cushioning member can comprise a resiliently compressible material.

A feature of this embodiment is that the cushioning member can comprise a length thereof being generally equal to a length of the respective support arm.

A feature of this embodiment is that the cushioning member can comprise one or more portions disposed in a spaced apart relationship with each other on the respective support arm.

A feature of this embodiment is that the apparatus can further comprise a strap attached to the each of the two brackets, the strap having ends being releasably securable to each other during use of the apparatus.

A feature of this embodiment is that the means for mounting the trays can comprise a slatwall member.

A feature of this embodiment is that the means for mounting the trays can comprise a pegboard member.

A feature of this embodiment is that the means for mounting the trays can comprise a plurality of elongated rails being spaced apart with each other in the generally vertical direction, each elongated rail from the plurality of elongated rails being disposed in a generally horizontal direction.

A feature of this embodiment is that the means for mounting the trays can comprises a rack, the rack comprising a base; and two tray support members upstanding on the base in a back-to-back relationship with each other at interior surfaces thereof, each tray support member from the two tray support members comprising: one end of the each tray support member being rigidly secured to the base, another end of the each tray support member defining a free top end of the rack, and elongated slots in a thickness of the each tray support member and in an open communication with an exterior surface thereof, the slots disposed in a spaced apart relationship with each other and generally horizontally during use of the apparatus.

A feature of this embodiment is that the apparatus can further comprise two or more braces, each brace from the two or more braces having one end thereof being rigidly secured to the base at one side edge thereof in a spaced apart relationship with the one end of the each tray support member; and an opposite end thereof being rigidly secured to one or both tray support members, the two or more braces being inclined relative to an exterior surface of the each tray support member.

A feature of this embodiment is that the apparatus can further can comprise four wheels attached to the base.

A feature of this embodiment is that the each tray support member can comprise a panel with a pair of spaced apart planar surfaces defining a thickness of the each tray support member.

A feature of this embodiment is that the means for mounting the trays can comprise a rack, the rack comprising a base; and two tray support members upstanding on the base in a back-to-back relationship with each other at interior surfaces thereof, each tray support member from the two tray support members comprising one end of the each tray support member being rigidly secured to the base, another end of the each tray support member defining a free top end of the rack, and an orthogonal grid of apertures formed through a thickness of the each tray support member.

A feature of this embodiment is that the means for mounting the trays can comprise a rack, the rack comprising a base; and two tray support members, each tray support member from the two tray support members comprising a bottom edge thereof being rigidly secured to the base adjacent one edge thereof so that the bottom edges of the two tray support members are in a spaced apart relationship with each other, a top edge thereof being rigidly secured to a top edge of another tray support member so that the each tray support member being inclined inwardly and defining a generally triangular cross-section of the rack in a plane normal to a width thereof, and elongated slots in a thickness of the each tray support member and in an open communication with an exterior thereof, the slots disposed in a spaced apart relationship with each other and generally horizontally during use of the apparatus.

A feature of this embodiment is that the means for mounting the trays can comprise a rack, the rack comprising a base; and two tray support members, each tray support member from the two tray support members comprising a bottom edge thereof being rigidly secured to the base adjacent one edge thereof so that the bottom edges of the two tray support members are in a spaced apart relationship with each other, a top edge thereof being rigidly secured to a top edge of another tray support member so that the each tray support member being inclined inwardly and defining a generally triangular cross-section of the rack in a plane normal to a width thereof, and an orthogonal grid of apertures formed through a thickness of the each tray support member.

A feature of this embodiment is that the means for mounting the trays can comprise a rack, the rack comprising a base; a frame upstanding on the base and being rigidly secured thereto at one end thereof; and a plurality of elongated rails secured to the frame in a spaced apart relationship with each other in the generally vertical direction and extending in a generally horizontal direction.

A feature of this embodiment is that the means for mounting the trays can comprise a panel with a pair of planar surfaces spaced apart from each other to define a thickness of the panel, the surfaces being rigidly secured in the generally vertical plane during use of the apparatus, the panel further comprising an orthogonal grid of apertures through the thickness.

A feature of this embodiment is that the means for mounting the trays can comprise a panel with a pair of planar surfaces spaced apart from each other to define a thickness of the panel, the surfaces being rigidly secured in the generally vertical plane during use of the apparatus, the panel further comprising elongated slots in the thickness and in an open communication with one planar surface from the pair of planar surfaces, the elongated slots disposed in a spaced apart relationship with each other and generally horizontally during use of the apparatus.

A feature of this embodiment is that the means for mounting the trays can comprise a panel with a pair of planar surfaces spaced apart from each other to define a thickness of the panel, the surfaces being rigidly secured in the generally vertical plane during use of the apparatus, the panel further comprising elongated slots in the thickness and in an open communication with each planar surface from the pair of planar surfaces, the elongated slots disposed in a spaced apart relationship with each other and generally horizontally during use of the apparatus.

In an embodiment, a storage apparatus is provided that at least stores plug-in units used in track busways for overhead power distribution, each plug-in unit with a housing, a connector extending from a top surface of the housing and a power cable extending from a bottom surface of the housing in a direction being opposite to a direction of the connector. The storage apparatus comprises trays configured to adjustably support plug-in units of different width at bottom surfaces thereof without interference with the power cables; and a means for mounting the trays in a generally vertical plane.

In an embodiment, a method of storing objects of various widths/sizes comprises steps of providing a panel or a rack with one or more panels; releaseably coupling trays to the one or more panels; adjusting a width of each tray in a relationship to a width of plug-in units to be supported thereon; and placing one or more plug-in units onto the each tray.

A feature of this embodiment is that the method can further comprise a step of securing, with a strap, the one or more plug-in units placed onto the each tray.

A feature of this embodiment is that the step of securing the one or more plug-in units comprises a step of forming, with the strap, a loop, a step of positioning the one or more plug-in units within the loop, and a step of releaseably securing ends of the strap therebetween.

A feature of this embodiment is that the method can further comprise a step of at least restricting, with side flanges on the each tray, a side-to-side movement of the one or more plug-in units during a movement of the rack.

In an embodiment, a method of transporting objects of varying widths/sizes comprises the steps of providing a mobile rack; releaseably coupling trays to the mobile rack; adjusting a width of each tray in a relationship to a width of the object(s) to be supported thereon; placing one or more objects onto at least one tray; securing, with a strap, the objects; and moving the mobile rack with the plurality of objects secured thereon.

In an embodiment, a method of transporting objects of varying widths/sizes comprises providing a mobile rack; releaseably coupling trays to the mobile rack; adjusting a width of each tray in a relationship to a width of objects to be supported thereon; placing one or more objects from the plurality of objects onto the each tray; at least restricting, with side flanges on the each tray, a side-to-side movement of the one or more objects during a movement of the rack; and moving the mobile rack with the plurality of objects secured thereon.

In an embodiment, therein is provided an adjustable tray that comprises a pair of brackets connected with a guide. Each bracket and guide can be constructed in an accordance with any of the above described examples.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described exemplary embodiments of the invention may be made by those skilled in the art without departing from the spirit and scope of the invention as set forth in the appended claims.

It should be appreciated that reference throughout this specification to "an embodiment" means that a particular feature, structure or characteristic described in connection with the embodiment is included in at least one embodiment of the disclosed subject matter. Therefore, it is emphasized and should be appreciated that two or more references to "an embodiment" in various portions of this specification are not necessarily all referring to the same embodiment or the same variation. Furthermore, the particular features, structures or characteristics may be combined as suitable in one or more embodiments of the disclosed subject matter.

Similarly, it should be appreciated that in the description of embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

Any element in a claim that does not explicitly state "means for" performing a specified function, or "step for" performing a specified function, is not to be interpreted as a "means" or "step" clause as specified in 35 U.S.C. § 112, 6. In particular, any use of "step of" in the claims is not intended to invoke the provision of 35 U.S.C. § 112, 6.

Anywhere the term "comprising" is used, embodiments and components "consisting essentially of" and "consisting of" are expressly disclosed and described herein."

To the extent that the appended claims have been drafted without multiple dependencies, it should be noted that all possible combinations of features which would be implied by rendering the claims multiply dependent are explicitly envisaged and should be considered part of the invention.

Furthermore, the Abstract is not intended to be limiting as to the scope of the claimed subject matter and is for the purpose of quickly determining the nature of the claimed subject matter.

What is claimed is:

1. An apparatus comprising:
trays, each tray from said trays comprises:
two brackets mounted, during use of said apparatus, in a side-by-side relationship with each other, each bracket from said two brackets comprising:

a main portion,
a mounting member disposed at one edge of said main portion, and
a support arm having a proximal end thereof being securely coupled to said main portion, said support arm extending outwardly from said main portion;
a guide having a first portion thereof securely coupled to one bracket from said two brackets and a second portion thereof securely coupled to another one bracket from said two brackets, said first portion and said second portion configured to move in a linear direction relative to one another while being interlocked with each other;
a pair of flanges disposed substantially parallel with each other, each flange from said pair of flanges extending, substantially perpendicular, from said main portion of a respective bracket;
a pair of elongated apertures, each elongated aperture from said pair of elongated apertures formed through a thickness of a respective flange;
a strap having ends being releasably securable to each other, said strap being passed through said each elongated aperture;
a fastener configured to releasably secure said ends of said strap therebetween; and
a means for mounting said trays in a generally vertical plane.

2. The apparatus of claim 1, wherein said support arm comprises a pair of flanges defining an L-shaped cross-section in a plane normal to a length of said support arm, one flange of said pair of flanges being disposed, during said use of said apparatus, generally horizontally and another flange of said pair of flanges being disposed, during said use of said apparatus, generally vertically, where said another flange being disposed generally vertically is positioned at one edge of said one flange being disposed generally horizontally.

3. The apparatus of claim 1, further comprising a pair of stops, each stop from said pair of stops being rigidly secured to a distal end of a respective support arm.

4. The apparatus of claim 1, wherein each of said first portion of said guide and said second portion of said guide is a tubular member with a hollow interior, one tubular member having a peripheral surface thereof being sized to pass through a hollow interior of another tubular member.

5. The apparatus of claim 1, further comprising a device configured to fix a distance between support arms during said use of said apparatus.

6. The apparatus of claim 5, wherein said device comprises a threaded aperture in one of said first and second portions of said guide and a fastener having a threaded portion configured to operatively engage said threaded aperture and being configured to abut, at a free end thereof, a peripheral surface of another one of said first and second portions of said guide and apply a force onto said peripheral surface, said force being sufficient to prevent a movement of said one portion of said guide in said linear direction relative to another portion of said guide.

7. The apparatus of claim 1, further comprising a pair of additional flanges, each of said pair of additional flanges extending from a respective flange and being disposed substantially parallel to a surface of a respective main portion.

8. The apparatus of claim 1, wherein said mounting member comprises a pair of hooks disposed in a spaced apart relationship with each other along said one edge of said main portion, each hook from said pair of hooks defines an L-shaped configuration with a first portion disposed generally horizontally during use of said apparatus and a second portion disposed generally vertically during said use of said apparatus and extending upwardly from said first portion of said each hook.

9. The apparatus of claim 1, wherein said mounting member comprises a pair of hooks disposed in a spaced apart relationship with each other along said one edge of said main portion, each hook from said pair of hooks defines an L-shaped configuration with a first portion disposed generally horizontally during use of said apparatus and a second portion disposed generally vertically during said use of said apparatus and extending downwardly from said first portion of said each hook.

10. The apparatus of claim 1, wherein said first portion of said guide comprises a first tubular member and wherein said second portion of said guide comprises a second tubular member being sized, in a cross-section, larger or a smaller than a cross-section of said first tubular member, so that said first and second tubular members movable in said linear direction while one tubular member from said first and second tubular members is disposed within another tubular member from said first and second tubular members, said first and second tubular members being interlocked with each other.

11. The apparatus of claim 1, further comprising two cushioning members, each cushioning member from said two cushioning members being disposed on a respective support arm.

12. The apparatus of claim 1, wherein said means for mounting said trays comprises a rack, said rack comprising:
a base; and
two tray support members upstanding on said base in a back-to-back relationship with each other at interior surfaces thereof, each tray support member from said two tray support members comprising:
one end of said each tray support member being rigidly secured to said base,
another end of said each tray support member defining a free top end of said rack, and
an orthogonal grid of apertures formed through a thickness of said each tray support member.

13. The apparatus of claim 1, wherein said means for mounting said trays comprises a rack, said rack comprising:
a base; and
two tray support members, each tray support member from said two tray support members comprising:
a bottom edge thereof being rigidly secured to said base adjacent one edge thereof so that the bottom edges of said two tray support members are in a spaced apart relationship with each other,
a top edge thereof being rigidly secured to a top edge of another tray support member so that said each tray support member being inclined inwardly and defining a generally triangular cross-section of said rack in a plane normal to a width thereof, and
elongated slots in a thickness of said each tray support member and in an open communication with an exterior thereof, said slots disposed in a spaced apart relationship with each other and generally horizontally during use of said apparatus.

14. The apparatus of claim 1, wherein said means for mounting said trays comprises a rack, said rack comprising:
a base; and
two tray support members, each tray support member from said two tray support members comprising:

a bottom edge thereof being rigidly secured to said base adjacent one edge thereof so that the bottom edges of said two tray support members are in a spaced apart relationship with each other, a top edge thereof being rigidly secured to a top edge of another tray support member so that said each tray support member being inclined inwardly and defining a generally triangular cross-section of said rack in a plane normal to a width thereof, and an orthogonal grid of apertures formed through a thickness of said each tray support member.

15. The apparatus of claim 1, wherein said means for mounting said trays comprises a panel with elongated slots in a thickness of said panel and in an open communication with an exterior surface thereof, said slots disposed in a spaced apart relationship with each other and generally horizontally during use of said apparatus.

16. The apparatus of claim 1, wherein said means for mounting said trays comprises a panel with an orthogonal grid of apertures through a thickness of said panel.

17. An apparatus, comprising: adjustable trays, each adjustable tray comprising:
a first bracket comprising:
a first main portion disposed generally vertically during use of said each adjustable tray,
a first mounting member disposed at a first edge of said first main portion,
a first L-shaped support arm having a proximal end thereof being rigidly secured to said first main portion at a second edge thereof, said second edge being opposite to said first edge, said first L-shaped support arm extending outwardly from said first main portion, a first leg of said first L-shaped support arm being disposed generally horizontally during said use of said each adjustable tray and a second leg of said first L-shaped support arm being disposed generally vertically,
a first stop rigidly secured to a distal end of said first L-shaped support arm,
a first L-shaped flange with a first leg rigidly secured to said first main portion at a third edge thereof and extending in a direction of said first L-shaped support arm, and a second leg disposed generally parallel to said first main portion,
a first aperture formed through a thickness of said first leg of said first L-shaped flange,
a second aperture formed through a thickness of said first leg of said first L-shaped flange at a distance from said first aperture, and
a first guide with a portion thereof being rigidly secured to at least one of said first main portion and said first L-shaped support arm, said first guide extending through said first aperture in a direction away from said second leg of said first L-shaped support arm;
a second bracket comprising:
a second main portion disposed generally vertically during said use of said each adjustable tray,
a second mounting member disposed at a first edge of said second main portion,
a second L-shaped support arm having a proximal end thereof being rigidly secured to said second main portion at a second edge thereof, said second edge of said second main portion being opposite to said first edge of said second main portion, said second L-shaped support arm extending outwardly from said second main portion, a first leg of said second L-shaped support arm being disposed generally horizontally during said use of said each adjustable tray and a second leg of said second L-shaped support arm being disposed generally vertically,
a second stop rigidly secured to a distal end of said second L-shaped support arm,
a second L-shaped flange with a first leg rigidly secured to said second main portion at a third edge thereof and extending in a direction of said second L-shaped support arm, and a second leg disposed generally parallel to said second main portion,
a first aperture formed through a thickness of said second leg of said second L-shaped flange,
a second aperture formed through said second leg of said second L-shaped support arm,
a third aperture formed through a thickness of said first leg of said second L-shaped flange at a distance from said first aperture, and
a second guide with a portion thereof being rigidly secured to at least one of said second main portion and said second L-shaped support arm, said second guide extending in a direction away from said second leg of said second L-shaped support arm, said second guide comprising a hollow interior aligned with said first aperture of said second L-shaped flange and with said second aperture;
a strap passed, at least during said use of said adjustable tray, through said second aperture in said first leg of said first L-shaped flange and said third aperture in said first leg of said second L-shaped flange, said strap having ends being releasably securable to each other; and
a means for mounting said adjustable trays in a generally vertical plane;
said first guide passing, during said use of said each adjustable tray, through said hollow interior of said second guide and through said first aperture of said second L-shaped flange and through said second aperture, so that said first bracket and said second bracket are movable in a linear direction relative to one another in order to vary a distance, in a horizontal direction, between said second leg of said first L-shaped support arm and said second leg of said second L-shaped support arm.

18. The apparatus of claim 17, wherein said each of the first mounting member and said second mounting member comprises a flange, said flange comprising a first portion disposed generally horizontally during use of said apparatus and a second portion disposed generally vertically during said use of said apparatus and extending upwardly from said first portion of said flange, said first and second portions of said flange defining an L-shaped configuration of said flange in a plane normal to a length thereof.

19. The apparatus of claim 17, wherein said means for mounting said trays comprises a rack, said rack comprising:
a base; and
two tray support members upstanding on said base in a back-to-back relationship with each other at interior surfaces thereof, each tray support member from said two tray support members comprising:
one end of said each tray support member being rigidly secured to said base,
another end of said each tray support member defining a free top end of said rack, and
elongated slots in a thickness of said each tray support member and in an open communication with an exterior surface thereof, said slots disposed in a spaced apart relationship with each other and generally horizontally during use of said apparatus.

20. The apparatus of claim 19, wherein said each tray support member comprises a panel with a pair of spaced apart planar surfaces defining a thickness of said each tray support member.

21. The apparatus of claim 17, wherein said means for mounting said trays comprises a rack, said rack comprising:
a base;
a frame upstanding on said base and being rigidly secured thereto at one end thereof; and
a plurality of elongated rails secured to said frame in a spaced apart relationship with each other in said generally vertical plane and extending in a generally horizontal direction.

22. An adjustable tray, comprising
a first bracket comprising:
   a first main portion disposed generally vertically during use of said adjustable tray,
   a first mounting member disposed at a first edge of said first main portion,
   a first L-shaped support arm having a proximal end thereof being rigidly secured to said first main portion at a second edge thereof, said second edge being opposite to said first edge, said first L-shaped support arm extending outwardly from said first main portion, a first flange of said first L-shaped support arm being disposed generally horizontally during said use of said adjustable tray and a second flange of said first L-shaped support arm being disposed generally vertically,
   a first stop rigidly secured to a distal end of said first L-shaped support arm,
   a first L-shaped flange with a first leg rigidly secured to said first main portion at a third edge thereof and extending in a direction of said first L-shaped support arm, and a second leg disposed generally parallel to said first main portion,
   a first aperture formed through a thickness of said first leg of said first L-shaped flange,
   a second aperture formed through a thickness of said first leg of said first L-shaped flange at a distance from said first aperture, and
   a first guide with a portion thereof being rigidly secured to at least one of said first main portion and said first L-shaped support arm, said first guide extending through said first aperture in a direction away from said second flange of said first L-shaped support arm;
a second bracket comprising:
   a second main portion disposed generally vertically during said use of said adjustable tray,
   a second mounting member disposed at a first edge of said second main portion,
   a second L-shaped support arm having a proximal end thereof being rigidly secured to said second main portion at a second edge thereof, said second edge of said second main portion being opposite to said first edge of said second main portion, said second L-shaped support arm extending outwardly from said second main portion, a first flange of said second L-shaped support arm being disposed generally horizontally during said use of said adjustable tray and a second flange of said second L-shaped support arm being disposed generally vertically,
   a second stop rigidly secured to a distal end of said second L-shaped support arm,
   a second L-shaped flange with a first leg rigidly secured to said second main portion at a third edge thereof and extending in a direction of said second L-shaped support arm, and a second leg disposed generally parallel to said second main portion,
   a first aperture formed through a thickness of said second leg of said second L-shaped flange,
   a second aperture formed through said second leg of said second L-shaped support arm,
   a third aperture formed through a thickness of said first leg of said second L-shaped flange at a distance from said first aperture, and
   a second guide with a portion thereof being rigidly secured to at least one of said second main portion and said second L-shaped support arm, said second guide extending in a direction away from said second leg of said second L-shaped support arm, said second guide comprising a hollow interior aligned with said first aperture of said second L-shaped flange and with said second aperture; and
a strap passed, during said use of said adjustable tray, through said second aperture in said first leg of said first L-shaped flange and said third aperture in said first leg of said second L-shaped flange, said strap having ends being releasably securable to each other;
said first guide passing, during said use of said adjustable tray, through said hollow interior of said second guide and through said first aperture of said second L-shaped flange and through said second aperture, so that said first bracket and said second bracket are movable in a linear direction relative to one another in order to vary a distance, in a horizontal direction, between said second leg of said first L-shaped support arm and said second leg of said second L-shaped support arm.

23. An apparatus, comprising:
trays, each tray from the trays comprises:
   two brackets mounted, during use of the apparatus, in a side-by-side relationship with each other, each bracket from the two brackets comprising:
      a main portion,
      a mounting member disposed at one edge of the main portion, and
      a support arm having a proximal end thereof being securely coupled to the main portion, the support arm extending outwardly from the main portion;
   a guide having a first portion thereof securely coupled to one bracket from the two brackets and a second portion thereof securely coupled to another one bracket from the two brackets, the first portion and the second portion configured to move in a linear direction relative to one another while being interlocked with each other;
   a pair of flanges disposed substantially parallel with each other, each flange from the pair of flanges extending, substantially perpendicular, from the main portion of a respective bracket;
   a pair of elongated apertures, each elongated aperture from the pair of elongated apertures formed through a thickness of a respective flange;
   a strap having ends being releasably securable to each other during use of the apparatus, the strap being passed through said each elongated aperture;
   a fastener configured to releasably secure the ends of the strap therebetween; and
a rack configured to support said trays in a generally vertical plane, the rack comprising:
   a base, and two tray support members upstanding on the base in a back-to-back relationship with each other at interior surfaces thereof, each tray support member from the two tray support members comprising:
one end of said each tray support member being rigidly secured to the base, another end of said each tray support member defining a free top end of the rack, and
elongated slots in a thickness of said each tray support member and in an open communication with an exterior surface thereof, the elongated slots disposed in a spaced apart relationship with each other and generally horizontally during use of the apparatus.

24. An apparatus, comprising:
trays, each tray from the trays comprises:
two brackets mounted, during use of the apparatus, in a side-by-side relationship with each other, each bracket from the two brackets comprising:
a main portion,
a mounting member disposed at one edge of the main portion, the mounting member comprising a flange, the flange comprising a first portion positionable generally horizontally and a second portion positionable generally vertically and extending upwardly from the first portion of the flange, the first and second portions of the flange defining an L-shaped configuration of the flange in a plane normal to a length thereof, and
a support arm having a proximal end thereof being securely coupled to the main portion, the support arm extending outwardly from the main portion;
a guide having a first portion thereof securely coupled to one bracket from the two brackets and a second portion thereof securely coupled to another one bracket from the two brackets, the first portion and the second portion configured to move in a linear direction relative to one another while being interlocked with each other;
a pair of flanges disposed substantially parallel with each other, each flange from the pair of flanges extending, substantially perpendicular, from the main portion of a respective bracket;
a pair of elongated apertures, each elongated aperture from the pair of elongated apertures formed through a thickness of a respective flange;
a strap having ends being releasably securable to each other during use of the apparatus, the strap sized to be passed through said each elongated aperture;
a fastener configured to releasably secure the ends of the strap therebetween; and
a rack configured to support said trays in a generally vertical plane, the rack comprising:
a base,
a frame upstanding on the base and being rigidly secured thereto at one end thereof, and a plurality of elongated rails secured to the frame in a spaced apart relationship with each other in a generally vertical plane and extending in a generally horizontal direction.

25. An apparatus, comprising:
trays configured to support objects at bottom surfaces thereof, each tray from the trays comprises:
two brackets mounted, during use of the apparatus, in a side-by-side relationship with each other, each bracket from the two brackets comprising:
a main portion,
a mounting member disposed at one edge of the main portion, and
a support arm having a proximal end thereof being securely coupled to the main portion, the support arm extending outwardly from the main portion;
a guide having a first portion thereof securely coupled to one bracket from the two brackets and a second portion thereof securely coupled to another one bracket from the two brackets, the first portion and the second portion configured to move in a linear direction relative to one another while being interlocked with each other;
a pair of flanges disposed substantially parallel with each other, each flange from the pair of flanges extending, substantially perpendicular, from the main portion of a respective bracket; a pair of elongated apertures; each elongated aperture from the pair of elongated apertures formed through a thickness of a respective flange;
a strap having ends being releasably securable to each other during use of the apparatus, the strap being passed through said each elongated aperture; a fastener configured to releasably secure the ends of the strap therebetween; and
a rack configured to support said trays in a generally vertical plane, the rack comprising:
a base,
a frame upstanding on the base and being rigidly secured thereto at one end thereof, and
a plurality of elongated rails secured to the frame in a spaced apart relationship with each other in a generally vertical plane and extending in a generally horizontal direction.

* * * * *